US012810761B2

(12) United States Patent
Kim et al.

(10) Patent No.: US 12,810,761 B2
(45) Date of Patent: Nov. 24, 2026

(54) GATE DRIVER, DISPLAY DEVICE INCLUDING THE SAME, AND ELECTRONIC DEVICE

(71) Applicant: Samsung Display Co., Ltd., Yongin-si (KR)

(72) Inventors: Hyun Joon Kim, Yongin-si (KR); Jung Hwan Hwang, Yongin-si (KR); Dan Won Lim, Yongin-si (KR); Min Do Heo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/367,701

(22) Filed: Oct. 23, 2025

(65) Prior Publication Data

US 2026/0196153 A1 Jul. 9, 2026

(30) Foreign Application Priority Data

Jan. 6, 2025 (KR) ........................ 10-2025-0001543

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01); *G09G 2310/06* (2013.01)

(58) Field of Classification Search
CPC ............. G09G 3/20; G09G 2310/0267; G09G 310/0286; G09G 2310/06; G09G 3/3674–3677; G09G 3/326
See application file for complete search history.

(56) References Cited

U.S. PATENT DOCUMENTS

| | | | |
|---|---|---|---|
| 9,515,647 | B2 | 12/2016 | Lim et al. |
| 9,542,889 | B2 | 1/2017 | Lee et al. |
| 9,620,063 | B2 | 4/2017 | Kim |
| 9,685,948 | B2 | 6/2017 | Kim et al. |
| 11,127,339 | B2 | 9/2021 | Kim et al. |

(Continued)

FOREIGN PATENT DOCUMENTS

| | | |
|---|---|---|
| KR | 10-2015-0115105 A | 10/2015 |
| KR | 10-2015-0141285 A | 12/2015 |

(Continued)

*Primary Examiner* — Hang Lin
(74) *Attorney, Agent, or Firm* — Womble Bond Dickinson (US) LLP

(57) ABSTRACT

A gate driver includes at least one stage including: a first transistor connected between a clock signal line and a first output terminal to output a scan signal, and including a gate electrode connected to a Q node; a first capacitor connected between the gate electrode and the second electrode; a second transistor connected between the first output terminal and a second power supply; a third transistor connected between the first output terminal and a first power supply; an eleventh transistor connected between the clock signal line and a second output terminal; a twelfth transistor connected between the second output terminal and the second power supply; a fourth transistor diode-connected between a first input terminal and the Q node; a fifth transistor connected between the Q node and the second power supply; and a sixth transistor connected between the Q node and the second power supply.

20 Claims, 14 Drawing Sheets

(56) References Cited

U.S. PATENT DOCUMENTS

2023/0335062 A1* 10/2023 In .......................... G09G 3/3266
2023/0402012 A1* 12/2023 Kim ...................... G09G 3/3233
2024/0005879 A1* 1/2024 Kim ...................... G09G 3/3266
2024/0257768 A1* 8/2024 Yoon ......................... G09G 3/20

FOREIGN PATENT DOCUMENTS

KR 10-2315888 B1 10/2021
KR 10-2024-0032001 A 3/2024

* cited by examiner

ST_D1: STi+1, STi+2
ST_D2: STi+3, STi+4
ST_M: . . . , STi-1, STi
ST: . . . , STi-1, STi, STi+1, STi+2, STi+3, STi+4

GATE DRIVER, DISPLAY DEVICE INCLUDING THE SAME, AND ELECTRONIC DEVICE

CROSS-REFERENCE TO RELATED APPLICATION

The present application claims priority to and the benefit of Korean Patent Application No. 10-2025-0001543, filed on Jan. 6, 2025, in the Korean Intellectual Property Office, the entire disclosure of which is incorporated by reference herein.

BACKGROUND

1. Field

Aspects of embodiments of the present disclosure relate to a gate driver, a display device including the gate driver, and an electronic device.

2. Description of the Related Art

A display device includes a data driver for driving data lines, a gate driver for driving scan lines, and pixels connected between the scan lines and the data lines.

The gate driver includes a plurality of stages that are dependently connected to each other, and each of the stages may be connected to a corresponding scan line to supply a scan signal. As such, the display device may include a plurality of signal lines that provide various signals to the plurality of stages.

The above information disclosed in this Background section is for enhancement of understanding of the background of the present disclosure, and therefore, it may contain information that does not constitute prior art.

SUMMARY

Embodiments of the present disclosure may be directed to a gate driver capable of minimizing or reducing a signal delay of a scan signal, a display device including the gate driver, and an electronic device.

However, the aspects and features of the present disclosure are not limited thereto, and the above and other aspects and features of the present disclosure will be more clearly understood from the following description.

According to one or more embodiments of the present disclosure, a gate driver includes: a plurality of stages, at least one of the plurality of stages including: a first transistor including a first electrode connected to a clock signal line, a second electrode connected to a first output terminal configured to output a scan signal, and a gate electrode connected to a Q node; a first capacitor connected between the gate electrode and the second electrode of the first transistor; a second transistor connected between the first output terminal and a second power supply, and including a gate electrode configured to receive a first next carry signal; a third transistor connected between the first output terminal and a first power supply, and including a gate electrode connected to a QB node; an eleventh transistor connected between the clock signal line and a second output terminal configured to output a carry signal, and including a gate electrode connected to the Q node; a twelfth transistor connected between the second output terminal and the second power supply, and including a gate electrode connected to the QB node; a fourth transistor diode-connected between a first input terminal configured to be applied with a previous carry signal and the Q node; a fifth transistor connected between the Q node and the second power supply, and including a gate electrode connected to a start signal line; and a sixth transistor connected between the Q node and the second power supply, and including a gate electrode configured to receive a second next carry signal.

In an embodiment, a voltage level of the second power supply may be lower than a voltage level of the first power supply.

In an embodiment, the clock signal line may be connected only to the first transistor and the eleventh transistor of the at least one of the plurality of stages.

In an embodiment, the at least one of the plurality of stages may further include: a seventh transistor connected between a third power supply and the QB node, and including a gate electrode connected to a second node; an eighth transistor connected between the QB node and the second power supply, and including a gate electrode connected to the Q node; a ninth transistor diode-connected between the third power supply and the second node; and a tenth transistor connected between the second node and the first power supply, and including a gate electrode connected to the Q node.

In an embodiment, the ninth transistor may include sub-transistors connected in series between the third power supply and the second node.

In an embodiment, the at least one of the plurality of stages may further include a thirteenth transistor connected between the Q node and the second output terminal, and including a gate electrode connected to the QB node.

In an embodiment, the at least one of the plurality of stages may further include a fourteenth transistor connected between the third power supply and a first node, and including a gate electrode connected to the Q node. The fourth transistor may include a first sub-transistor connected between the first input terminal and the first node, and a second sub-transistor connected between the first node and the Q node.

In an embodiment, the fourteenth transistor may include sub-transistors connected in series between the third power supply and the first node.

In an embodiment, the fifth transistor may include a third sub-transistor connected between the Q node and the first node, and a fourth sub-transistor connected between the first node and the second power supply. The sixth transistor may include a fifth sub-transistor connected between the Q node and the first node, and a sixth sub-transistor connected between the first node and the second power supply.

In an embodiment, a front stage located before the at least one of the plurality of stages may include the first transistor, the second transistor, the third transistor, the fourth transistor, the sixth transistor, and the first capacitor, but may not include the fifth transistor, and the first input terminal of the front stage may be connected to the start signal line instead of the previous carry signal.

In an embodiment, the plurality of stages may further include a first dummy stage located after the at least one stage, the first dummy stage may include the first transistor, the second transistor, the third transistor, the fourth transistor, the fifth transistor, the sixth transistor, and the first capacitor, and a first output terminal of the first dummy stage may not be configured to output the scan signal.

In an embodiment, a channel size of the first transistor of the first dummy stage may be less than a channel size of the first transistor of the at least one stage.

In an embodiment, the plurality of stages may further include a second dummy stage located after the first dummy stage, and the second dummy stage may include the first transistor, the third transistor, the fourth transistor, the fifth transistor, and the first capacitor, but may not include the second transistor and the sixth transistor. The second dummy stage may further include a fifteenth transistor connected between the Q node and the second power supply, and including a gate electrode connected to the second output terminal.

In an embodiment, the fifteenth transistor may include sub-transistors connected in series between the Q node and the second power supply.

According to one or more embodiments of the present disclosure, a display device includes: a display panel including pixels connected to scan lines and data lines; a data driver configured to supply a data signal to the data lines; and a gate driver including stages configured to respectively output scan signals to the scan lines. At least one of the stages includes: a first transistor including a first electrode connected to a clock signal line, a second electrode connected to a first output terminal configured to output a scan signal from among the scan signals, and a gate electrode connected to a Q node; a first capacitor connected between the gate electrode and the second electrode of the first transistor; a second transistor connected between the first output terminal and a second power supply, and including a gate electrode configured to receive a first next carry signal; a third transistor connected between the first output terminal and a first power supply, and including a gate electrode connected to a QB node; an eleventh transistor connected between the clock signal line and a second output terminal configured to output a carry signal, and including a gate electrode connected to the Q node; a twelfth transistor connected between the second output terminal and the second power supply, and including a gate electrode connected to the QB node; a fourth transistor diode-connected between a first input terminal configured to be applied with a previous carry signal and the Q node; a fifth transistor connected between the Q node and the second power supply, and including a gate electrode connected to a start signal line; and a sixth transistor connected between the Q node and the second power supply, and including a gate electrode configured to receive a second next carry signal.

In an embodiment, the clock signal line may be connected only to the first transistor and the eleventh transistor of the at least one of the stages.

In an embodiment, the at least one of the stages may further include: a seventh transistor connected between a third power supply and the QB node, and including a gate electrode connected to a second node; an eighth transistor connected between the QB node and the second power supply, and including a gate electrode connected to the Q node; a ninth transistor diode-connected between the third power supply and the second node; a tenth transistor connected between the second node and the first power supply, and including a gate electrode connected to the Q node; and a thirteenth transistor connected between the Q node and the second output terminal, and including a gate electrode connected to the QB node.

In an embodiment, the at least one of the stages may further include a fourteenth transistor connected between the third power supply and a first node, and including a gate electrode connected to the Q node. The fourth transistor may include a first sub-transistor connected between the first input terminal and the first node, and a second sub-transistor connected between the first node and the Q node.

In an embodiment, the fourth transistor may be configured to transfer the previous carry signal of a gate-on voltage to the Q node, the first transistor may be configured to be turned-on in response to a voltage of the Q node, a clock signal of the clock signal line may be configured to be output as the scan signal from among the scan signals, the second transistor may be configured to pull down a voltage level of the scan signal to a voltage level of the second power supply in response to the first next carry signal of the gate-on voltage, and the sixth transistor may be configured to pull down the voltage of the Q node to the voltage level of the second power supply in response to the second next carry signal of the gate-on voltage.

According to one or more embodiments of the present disclosure, an electronic device includes: a processor configured to provide image data; and a display device configured to display an image based on the image data. The display device includes: a display panel including pixels connected to scan lines and data lines; a data driver configured to supply a data signal to the data lines; and a gate driver including stages configured to respectively output scan signals to the scan lines. At least one of the stages includes: a first transistor including a first electrode connected to a clock signal line, a second electrode connected to a first output terminal configured to output a scan signal from among the scan signals, and a gate electrode connected to a Q node; a first capacitor connected between the gate electrode and the second electrode of the first transistor; a second transistor connected between the first output terminal and a second power supply, and including a gate electrode configured to receive a first next carry signal; a third transistor connected between the first output terminal and a first power supply, and including a gate electrode connected to a QB node; an eleventh transistor connected between the clock signal line and a second output terminal configured to output a carry signal, and including a gate electrode connected to the Q node; a twelfth transistor connected between the second output terminal and the second power supply, and including a gate electrode connected to the QB node; a fourth transistor diode-connected between a first input terminal configured to be applied with a previous carry signal and the Q node; a fifth transistor connected between the Q node and the second power supply, and including a gate electrode connected to a start signal line; and a sixth transistor connected between the Q node and the second power supply, and including a gate electrode configured to receive a second next carry signal.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
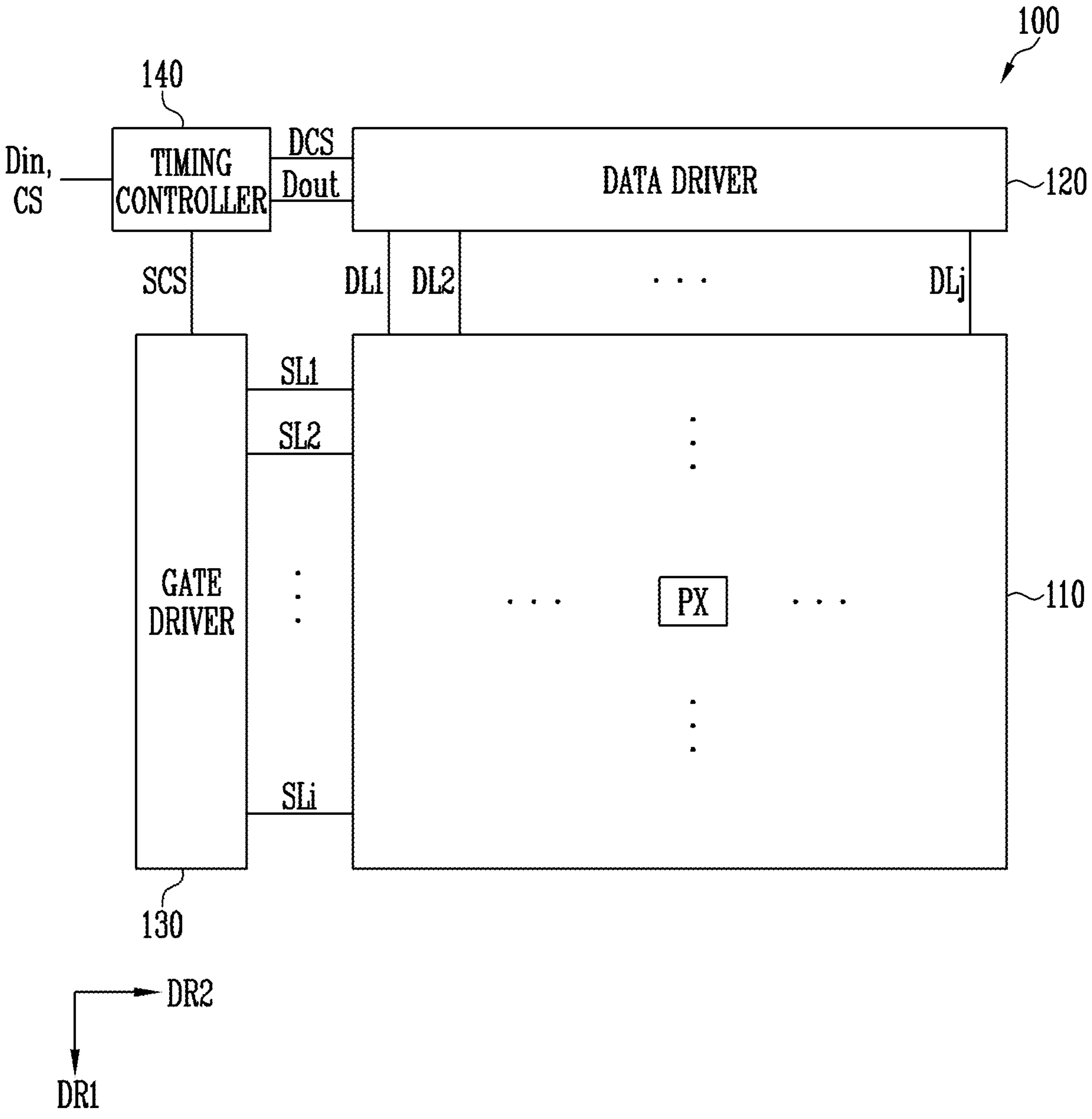
FIG. 1 is a diagram illustrating a display device according to some embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Some embodiments are illustrated in the accompanying drawings and described hereinafter with respect to functional blocks, units, and/or modules. Those having ordinary skill in the art will appreciate that such blocks, units and/or modules may be physically implemented by logic circuitry, discrete components, microprocessors, hard wire circuitry, memory elements, wiring connections, and/or other suitable electronic circuitry. They may be formed using semiconductor-based manufacturing techniques or other suitable manufacturing techniques. In the case of the blocks, the units and/or the modules implemented by microprocessors or other similar hardware, they may be programmed and controlled using software to perform the various functions described herein, and optionally, may be driven by firmware and/or software. In addition, each block, unit, and/or module may be implemented by dedicated hardware, or may be implemented by a combination of dedicated hardware for performing some functions and a processor (e.g., one or more programmed microprocessors and associated circuitry) for performing other functions. In addition, in some embodiments, the blocks, the units, and/or the modules may be physically separated into two or more separate blocks, units, or modules that interact with each other. In addition, in some embodiments, the blocks, the units, and/or the modules may be physically combined into more complex blocks, units, or modules.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device 100 according to some embodiments of the present disclosure.

Referring to FIG. 1, the display device 100 may include a pixel unit 110 (e.g., a display panel or a display layer), a data driver 120, a gate driver 130, and a timing controller 140. The data driver 120, the gate driver 130, and the timing controller 140 may be implemented as separate integrated circuits, or two or more of them may be implemented by being integrated together into one integrated circuit. In addition, the gate driver 130 may be formed in the pixel unit 110.

Data lines DL1 to DLj may be disposed to extend in a first direction DR1. The first direction DR1 may be, for example, a direction connecting an upper side and a lower side of the pixel unit 110 (or the gate driver 130) to each other. As another example, the first direction DR1 may be a direction connecting a left side and a right side of the pixel unit 110 to each other, or may refer to a direction different therefrom.

Scan lines SL1 to SLi may be disposed to extend in a second direction DR2. The second direction DR2 may be a direction intersecting or crossing the first direction DR1. The second direction DR2 may be a direction connecting the left side and the right side of the pixel unit 110 (or the gate driver 130) to each other. As another example, the second direction DR2 may be a direction connecting the upper side and the lower side of the pixel unit 110 to each other, or may refer to a direction different therefrom.

The pixel unit 110 may include pixels PX connected to the scan lines SL1 to SLi and the data lines DL1 to DLj (where i and j are natural numbers). For example, the pixels PX may be disposed in various suitable arrangements as would be understood by those having ordinary skill in the art.

The pixels PX are selected in units of horizontal lines (e.g., the pixels PX connected to the same scan line as each other may be classified into one horizontal line (or a pixel row)) when a scan signal is supplied to the scan lines SL1 to SLi, and the pixels PX selected by the scan signal may receive a data signal from one of the data lines DL1 to DLj connected to the pixels PX. The pixels PX supplied with the data signal may generate light having a desired luminance (e.g., a predetermined luminance) in response to a voltage of the data signal.

The data driver 120 may receive output data Dout and a data driving signal DCS from the timing controller 140. The data driving signal DCS may include sampling signals and/or timing signals used to drive the data driver 120. The data driver 120 may generate the data signal based on the data driving signal DCS and the output data Dout. For example, the data driver 120 may generate an analog data signal based on a gradation (e.g., a grayscale value or level) of the output data Dout.

The gate driver 130 may receive the scan driving signal SCS from the timing controller 140. The scan driving signal SCS may include at least one scan start signal and clock signals used for driving the gate driver 130. The gate driver 130 may generate the scan signal while shifting the scan start signal in response to the clock signal, and may sequentially supply the scan signal to the scan lines SL1 to SLi.

The gate driver 130 may include a plurality of stages connected to each of the scan lines SL1 to SLi. The stages include a shift register, and may supply the scan signal to a corresponding one of the scan lines SL1 to SLi connected thereto while shifting the scan start signal.

In an embodiment, the gate driver 130 may be formed together with the pixels PX in a process of forming the pixel unit 110. For example, the gate driver 130 may be formed in the pixel unit 110 in an Oxide Semiconductor thin film transistor Gate driver circuit (OSG) kind or an Amorphous Silicon thin film transistor Gate drivers circuit (ASG) kind.

The timing controller 140 may receive input data Din (e.g., image data) and a control signal CS from a host system through an interface. For example, the timing controller 140 may receive the input data Din and the control signal CS from at least one of a Graphics Processing Unit (GPU), a Central Processing Unit (CPU), and/or an Application Processor (AP) included in the host system. The control signal CS may include various suitable signals including the clock signal.

The timing controller 140 may generate the scan driving signal SCS and the data driving signal DCS based on the control signal CS. The scan driving signal SCS and the data driving signal DCS may be supplied to the gate driver 130 and the data driver 120, respectively.

The timing controller 140 may rearrange the input data Din to meet the specifications of the display device 100. In addition, the timing controller 140 may generate the output data Dout by correcting the input data Din, and may supply the output data Dout to the data driver 120. In an embodiment, the timing controller 140 may correct the input data Din in response to an optical measurement result measured in a process.

In an embodiment, the display device 100 may include a planar display device, a curved display device in which part of the pixel unit 110 may be bent or curved, a flexible display device in which a part thereof may be folded or bent, and a stretchable display device in which a part thereof may be stretched and contracted.

In an embodiment, the display device 100 may be a device for displaying a moving image or a still image, and may include a portable electronic device, such as a mobile phone, a smart phone, a tablet Personal Computer (PC), a smart watch, a watch phone, a mobile communication terminal, an electronic notebook, an electronic book, a Portable Multimedia Player (PMP), a navigation, an Ultra Mobile PC (UMPC), and the like. In an embodiment of the present disclosure, the display device 100 may include an electronic device, such as a television, a notebook, a monitor, a billboard, or an Internet of Things (IoT) device.

Figure 2:
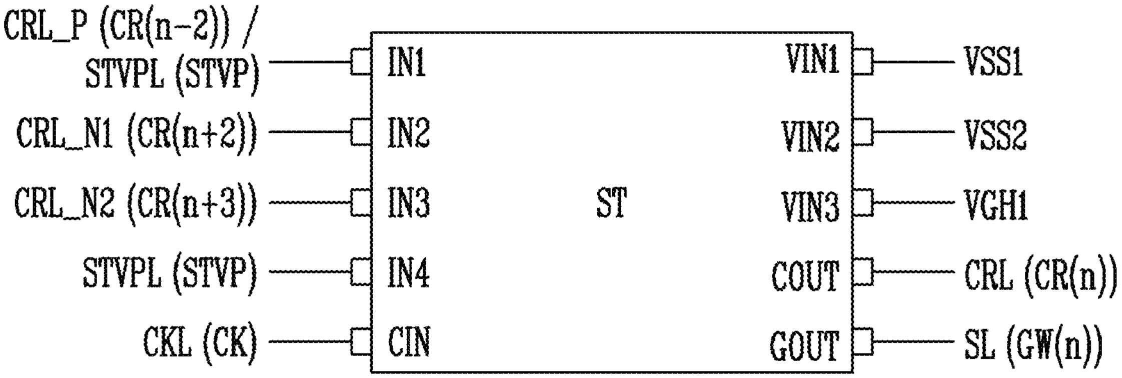
FIG. 2 is a diagram illustrating a stage included in a gate driver according to an embodiment of the present disclosure.

FIG. 2 is a diagram illustrating a stage ST included in the gate driver 130 according to an embodiment of the present disclosure. FIG. 2 illustrates the stage ST located on a nth horizontal line, where n is a natural number from among 1 to i.

Referring to FIG. 2, the stage ST (e.g., a unit or a circuit) may include a first input terminal IN1, a second input terminal IN2, a third input terminal IN3, a fourth input terminal IN4, a clock input terminal CIN, a first power input terminal VIN1, a second power input terminal VIN2, a third power input terminal VIN3, a first output terminal GOUT (e.g., a gate output terminal), and a second output terminal COUT (e.g., a carry clock terminal).

The first input terminal IN1 may be connected to a carry line CRL_P or a start signal line STVPL of a previous stage, and may receive a carry signal (e.g., a n−2th carry signal CR(n−2)) or a start signal STVP of the previous stage. When the carry signal or the start signal STVP is provided to the first input terminal IN1, the stage ST may output the carry signal (e.g., a nth carry signal CR(n)) to the second output terminal COUT, and may output the scan signal (e.g., a nth scan signal GW(n)) to the first output terminal GOUT.

The second input terminal IN2 may be connected to a carry line of a next stage (e.g., a first next carry line CRL_N1 of a first next stage), and may receive a first next carry signal (e.g., a n+2th carry signal CR(n+2)) of the next stage. When the first next carry signal is provided to the second input terminal IN2, the stage ST may transition or pull-down a voltage level of each of the carry signal and the scan signal from a gate-on voltage level to a gate-off voltage level.

The third input terminal IN3 may be connected to a carry line of a next stage (e.g., a second next carry line CRL_N2 of a second next stage), and may receive a second next carry signal (e.g., a n+3th carry signal CR(n+3)) of the next stage. When the second next carry signal is provided to the third input terminal IN3, the stage ST may stop outputting the carry signal and the scan signal.

The fourth input terminal IN4 may be connected to the start signal line STVPL, and may receive the start signal STVP. When the start signal STVP is provided to the fourth input terminal IN4, the stage ST may be reset.

Figure 6:
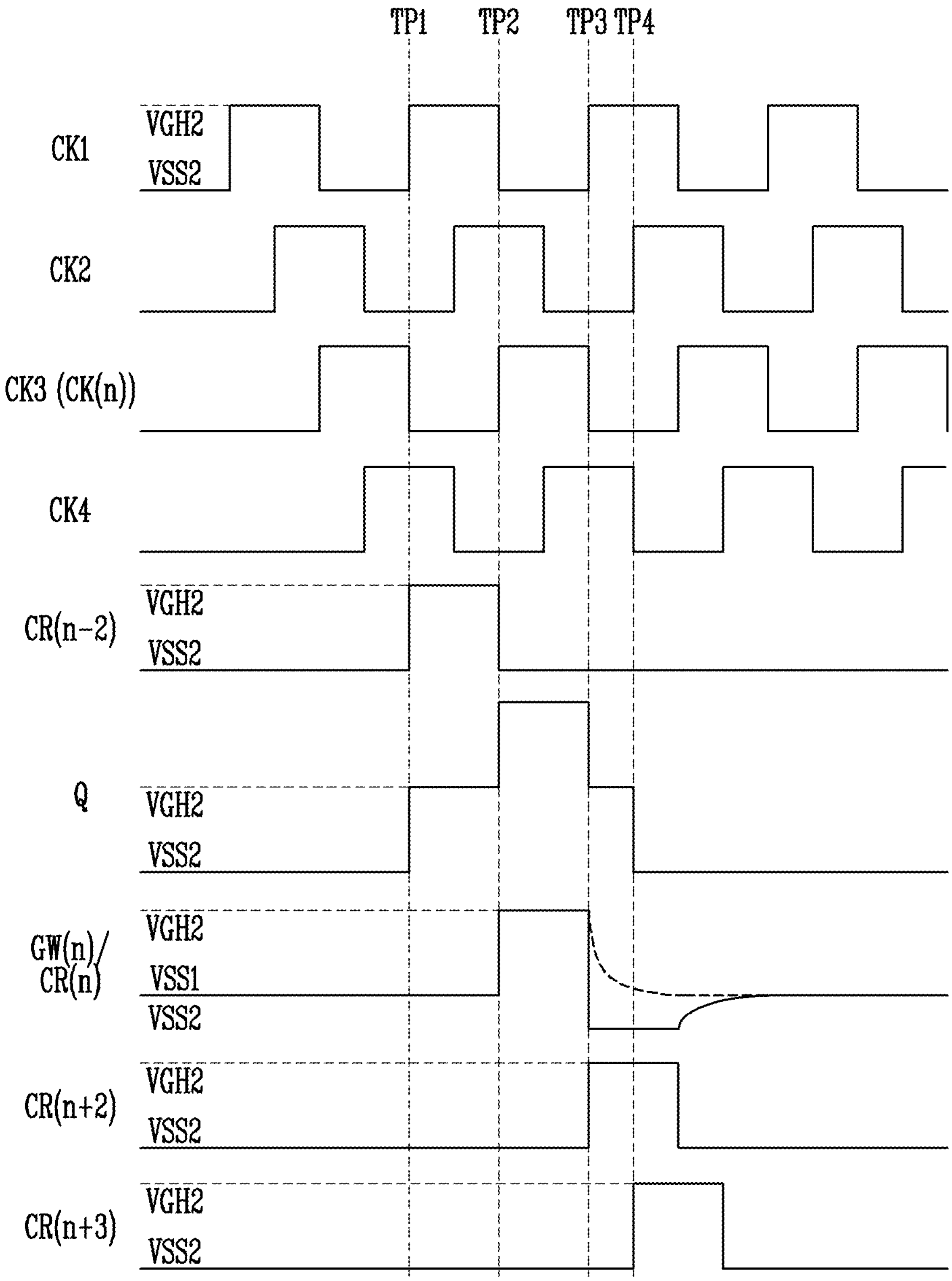
FIG. 6 is a waveform diagram illustrating an operation of the stage of FIG. 5.

The clock input terminal CIN may be connected to a clock line CKL, and may receive a clock signal CK transmitted through the clock line CKL. The stage ST may output the clock signal CK (e.g., a clock signal of the gate-on voltage) as the carry signal and the scan signal. In an embodiment, a plurality of clock signals having the same waveform as each other but different phases from each other may be provided according to an arrangement order of the stages. Referring to FIG. 6, for example, a first clock signal CK1 may be provided to the clock input terminal CIN of a 4(k−1)+1th stage, a second clock signal CK2 may be provided to the clock input terminal CIN of a 4(k−1)+2th stage, a third clock signal CK3 may be provided to the clock input terminal CIN of a 4(k−1)+3th stage, and a fourth clock signal CK4 may be provided to clock input terminal CIN of a 4kth stage. The four clock signals CK1 to CK4 are illustrated as examples, and the number of clock signals CK may be variously modified as needed or desired. For example, two clock signals CK may be alternately provided on an odd-numbered stage and an even-numbered stage.

The first power input terminal VIN1 may receive a first low voltage VSS1 (e.g., a first voltage, a first power supply, or the like). The second power input terminal VIN2 may receive a second low voltage VSS2 (e.g., a second voltage, a second power supply, or the like). The first low voltage VSS1 and the second low voltage VSS2 may have the gate-off voltage. A transistor that receives the gate-off voltage at a gate electrode may be turned-off. In an embodiment, a voltage level of the second low voltage VSS2 may be lower than that of the first low voltage VSS1.

The third power supply input terminal VIN3 may receive a first high voltage VGH1 (e.g., a third voltage, a third power supply, or the like). The first high voltage VGH1 may have the gate-on voltage level. A transistor that receives the gate-on voltage at a gate electrode may be turned-on.

The second output terminal COUT may be connected to a carry line CRL, and may output the carry signal (e.g., the nth carry signal CR(n)) to the carry line CRL. The first output terminal GOUT may be connected to the scan line SL, and may output a scan signal (e.g., the nth scan signal GW(n)) to the scan line.

The terminals IN1 to IN4, CIN, VIN1 to VIN3, COUT, and GOUT described above with reference to FIG. 2 are provided for convenience of illustration, and each of the terminals IN1 to IN4, CIN, VIN1 to VIN3, COUT, and GOUT may be a signal line through which a corresponding signal is transmitted, or may be a node connected to the signal line.

Figure 3:
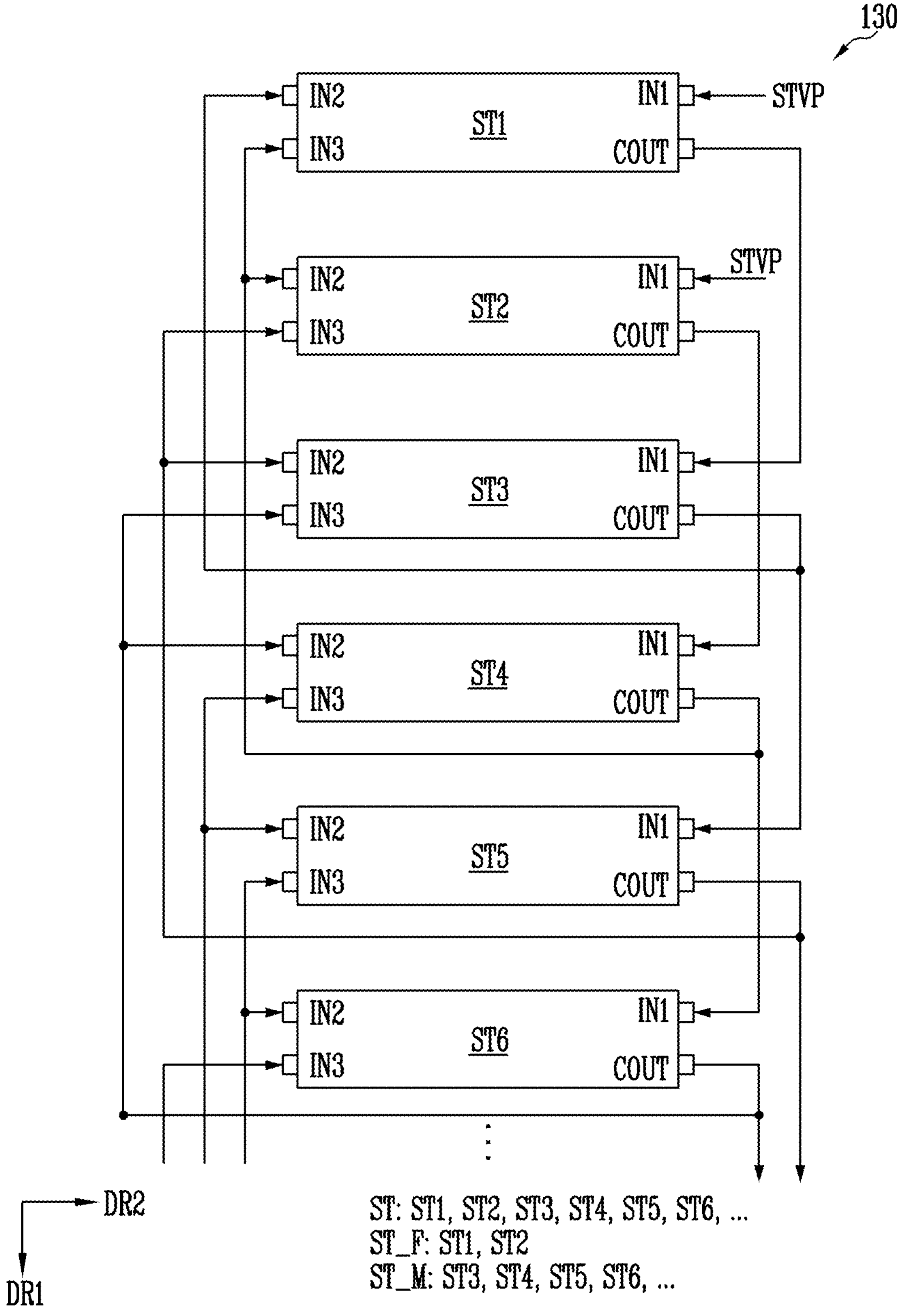
FIGS. 3 and 4 are diagrams illustrating a gate driver according to some embodiments.
Figure 4:
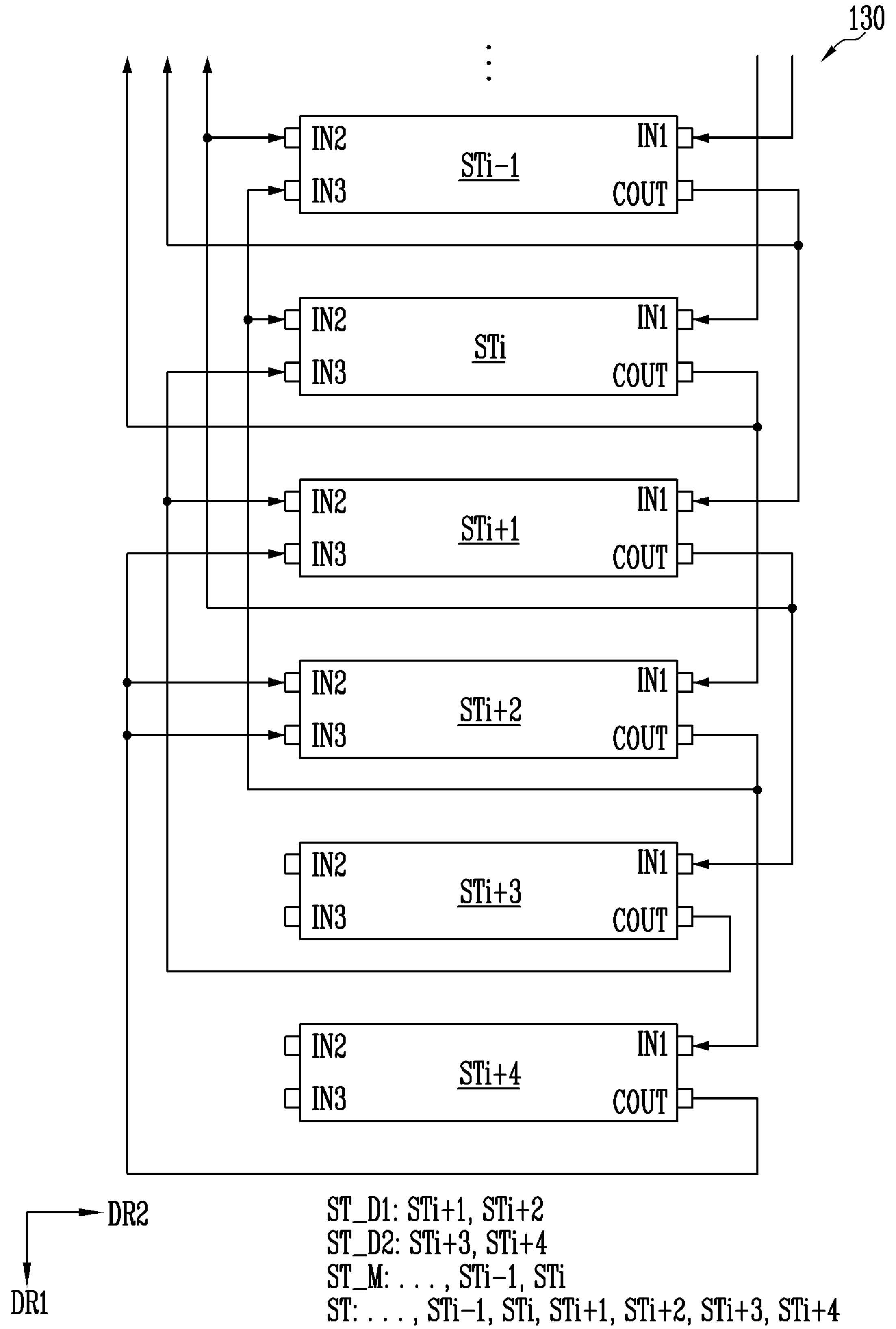

FIGS. 3 and 4 are diagrams illustrating the gate driver 130 according to some embodiments. FIGS. 3 and 4 illustrate a connection between the carry lines and the stages.

Referring to FIGS. 3 and 4, the gate driver 130 may include first to i+4th stages ST1 to STi+4 (e.g., units, circuits, or the stage ST).

The first input terminal IN1 of the first stage ST1 may receive the start signal STVP, and the second output terminal COUT of the first stage ST1 may output the carry signal. The first stage ST1 may output the carry signal in response to the start signal STVP. The second input terminal IN2 of the first stage ST1 may receive the carry signal of the third stage ST3 (e.g., the carry signal output from the second output terminal COUT of the third stage ST3), and the third input terminal IN3 of the first stage ST1 may receive the carry signal of the fourth stage ST4 (e.g., the carry signal output from the second output terminal COUT of the fourth stage ST4). The first stage ST1 may stop outputting the carry signal in response to the carry signal of the third stage ST3 and the carry signal of the fourth stage ST4.

The first input terminal IN1 of the second stage ST2 may receive the start signal STVP, and the second output terminal COUT of the second stage ST2 may output the carry signal. The second stage ST2 may output the carry signal in response to the start signal STVP. The second input terminal IN2 of the second stage ST2 may receive the carry signal of the fourth stage ST4 (e.g., the carry signal output from the second output terminal COUT of the fourth stage ST4), and the third input terminal IN3 of the second stage ST2 may receive the carry signal of the fifth stage ST5 (e.g., the carry signal output from the second output terminal COUT of the fifth stage ST5). The second stage ST2 may stop outputting the carry signal in response to the carry signal of the fourth stage ST4 and the carry signal of the fifth stage ST5.

The first stage ST1 and the second stage ST2, which output the carry signal in response to the start signal STVP, may be referred to as a front stage ST_F.

The first input terminal IN1 of the third stage ST3 may receive the carry signal of the first stage ST1, and the second output terminal COUT of the third stage ST3 may output the carry signal. The third stage ST3 may output the carry signal in response to the carry signal of the first stage ST1. The second input terminal IN2 of the third stage ST3 may receive the carry signal of the fifth stage ST5, and the third input terminal IN3 of the third stage ST3 may receive the carry signal of the sixth stage ST6. The third stage ST3 may stop outputting the carry signal in response to the carry signal of the fifth stage ST5 and the carry signal of the sixth stage ST6.

The first input terminal IN1 of the fourth stage ST4 may receive the carry signal of the second stage ST2, and the second output terminal COUT of the fourth stage ST4 may output the carry signal. The fourth stage ST4 may output the carry signal in response to the carry signal of the second stage ST2. The second input terminal IN2 of the fourth stage ST4 may receive the carry signal of the sixth stage ST6, and the third input terminal IN3 of the fourth stage ST4 may receive the carry signal of the seventh stage. The fourth stage ST4 may stop outputting the carry signal in response to the carry signal of the sixth stage ST6 and the carry signal of the seventh stage.

The first input terminal IN1 of the i−1th stage STi−1 may receive a previous carry signal, and the second output terminal COUT of the i−1th stage STi−1 may output the carry signal. The i−1th stage STi−1 may output the carry signal in response to the carry signal of the previous stage. The second input terminal IN2 of the i−1th stage STi−1 may receive the carry signal of the i+1th stage STi+1, and the third input terminal IN3 of the i−1th stage STi−1 may receive the carry signal of the i+2th stage STi+2. The i−1th stage STi−1 may stop outputting the carry signal in response to the carry signal of the i+1th stage STi+1 and the carry signal of the i+2th stage STi+2.

The first input terminal IN1 of the ith stage STi may receive a previous carry signal, and the second output terminal COUT of the ith stage STi may output the carry signal. The ith stage STi may output the carry signal in response to the carry signal of the previous stage. The second input terminal IN2 of the ith stage STi may receive the carry signal of the i+2th stage STi+2, and the third input terminal IN3 of the ith stage STi may receive the carry signal of the i+3th stage STi+3. The ith stage STi may stop outputting the carry signal in response to the carry signal of the i+2th stage STi+2 and the carry signal of i+3th stage STi+3.

The third stage ST3 to the ith stage STi, which output the carry signal in response to a previous carry signal, may be referred to as a main stage ST_M.

The first input terminal IN1 of the i+1th stage STi+1 may receive the carry signal of the i−1th stage STi−1, and the second output terminal COUT of the i+1th stage STi+1 may output the carry signal. The second input terminal IN2 of the i+1th stage STi+1 may receive the carry signal of the i+3th stage STi+3, and the third input terminal IN3 of the i+1th stage STi+1 may receive the carry signal of the i+4th stage STi+4. The i+1th stage STi+1 may stop outputting the carry signal in response to the carry signal of the i+3th stage STi+3 and the carry signal of the i+4th stage STi+4. The i+1th stage STi+1 is not connected to a scan line (e.g., the scan lines SL1 to SLi in FIG. 1).

The first input terminal IN1 of the i+2th stage STi+2 may receive the carry signal of the ith stage STi, and the second output terminal COUT of the i+2th stage STi+2 may output the carry signal. The second input terminal IN2 and the third input terminal IN3 of the i+2th stage STi+2 may receive the carry signal of the i+4th stage ST i+4. The i+2th stage STi+2 may stop outputting the carry signal in response to the carry signal of the i+4th stage STi+4. The i+2th stage STi+2 is not connected to a scan line (e.g., the scan lines SL1 to SLi in FIG. 1).

The i+1th stage STi+1 and the i+2th stage STi+2, which are not connected to the scan line and provide the carry signal to a previous stage, may be referred to as a first dummy stage ST_D1.

The first input terminal IN1 of the i+3th stage STi+3 may receive the carry signal of the i+1th stage STi+1, and the second output terminal COUT of the i+3th stage STi+3 may output the carry signal. The second input terminal IN2 and the third input terminal IN3 of the i+3th stage STi+3 are not provided with any signal. The i+3th stage STi+3 may not include the second input terminal IN2 and the third input terminal IN3.

The first input terminal IN1 of the i+4th stage STi+4 may receive the carry signal of the i+2th stage STi+2, and the second output terminal COUT of the i+4th stage STi+4 may output the carry signal. The second input terminal IN2 and the third input terminal IN3 of the i+4th stage STi+4 are not provided with any signal, and the i+4th stage STi+4 may not include the second input terminal IN2 and the third input terminal IN3.

The i+3th stage STi+3 and the i+4th stage STi+4, which are not provided with any signal to the second input terminal IN2 and the third input terminal IN3, and provide the carry signal to the first dummy stage ST_D1, may be referred to as a second dummy stage ST_D2.

Figure 5:
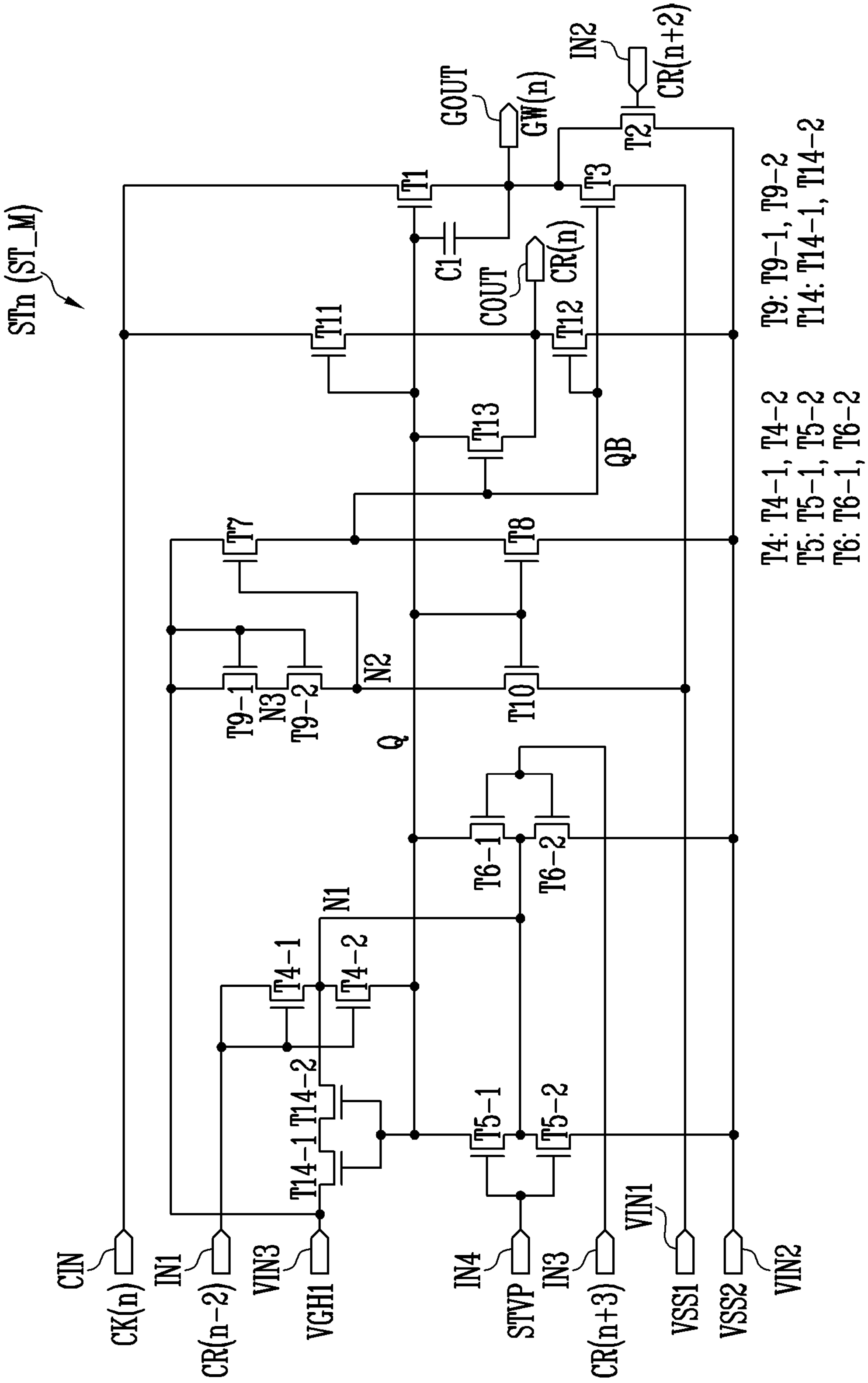
FIG. 5 is a diagram illustrating a stage included in the gate driver of FIGS. 3 and 4 according to an embodiment of the present disclosure.

FIG. 5 is a diagram illustrating the stage ST included in the gate driver 130 of FIGS. 3 and 4 according to an embodiment of the present disclosure.

Referring to FIGS. 3 to 5, a nth stage STn may be the main stage ST_M, where n may be greater than or equal to 3 and less than i.

The nth stage STn may include first to fourteenth transistors T1 to T14 and a first capacitor C1. Each of the first to fourteenth transistors T1 to T14 may be an n-type transistor, and may include, but is not limited to, an oxide semiconductor.

A first electrode of the first transistor T1 may be connected to the clock input terminal CIN, a second electrode may be connected to the first output terminal GOUT, and a gate electrode may be connected to a Q node (e.g., a first control node). The first transistor T1 may output a nth clock signal CK(n) of the clock input terminal CIN as the nth scan signal GW(n) in response to a voltage of the Q node.

The first capacitor C1 may be connected or formed between the gate electrode and the second electrode of the first transistor T1. The first capacitor C1 may bootstrap the voltage of the Q node based on the nth scan signal GW(n).

A first electrode of the second transistor T2 may be connected to the first output terminal GOUT, a second electrode may be connected to the second power input terminal VIN2, and a gate electrode may be connected to the second input terminal IN2. The second transistor T2 may pull-down a voltage level of the nth scan signal GW(n) to the second low voltage VSS2 of the second power input terminal VIN2 in response to the n+2th carry signal CR(n+2) (e.g., the first next carry signal) of the second input terminal IN2.

A first electrode of the third transistor T3 may be connected to the first output terminal GOUT, a second electrode may be connected to the first power input terminal VIN1, and a gate electrode may be connected to a QB node (e.g., a second control node). The third transistor T3 may maintain or substantially maintain the voltage level of the nth scan signal GW(n) at the first low voltage VSS1 of the first power input terminal VIN1 in response to a voltage of the QB node.

The first transistor T1, the second transistor T2, the third transistor T3, and the first capacitor C1 may form a first buffer circuit that outputs the nth scan signal GW(n).

A first electrode of the fourth transistor T4 may be connected to the first input terminal IN1, a second electrode may be connected to the Q node, and a gate electrode may be connected to the first input terminal IN1. The fourth transistor T4 may be connected in a diode form, and may transmit the n−2th carry signal CR(n−2) (e.g., the previous carry signal) of the first input terminal IN1 to the Q node. The fourth transistor T4 may form a first control circuit that controls the Q node.

In an embodiment, the fourth transistor T4 may include a 4-1th transistor T4-1 (e.g., a first sub-transistor) and a 4-2th transistor T4-2 (e.g., a second sub-transistor) connected in series between the first input terminal IN1 and the Q node. In other words, the fourth transistor T4 may be implemented as a double gate transistor. A first electrode of the 4-1th transistor T4-1 may be connected to the first input terminal IN1, a second electrode may be connected to a first node N1, and a gate electrode may be connected to the first input terminal IN1. A first electrode of the 4-2th transistor T4-2 may be connected to the first node N1, a second electrode may be connected to the Q node, and a gate electrode may be connected to the first input terminal IN1.

A first electrode of the fifth transistor T5 may be connected to the Q node, a second electrode may be connected to the second power input terminal VIN2, and a gate electrode may be connected to the fourth input terminal IN4. The fifth transistor T5 may connect the Q node and the second power input terminal VIN2 to each other in response to the start signal STVP of the fourth input terminal IN4. In this case, the second low voltage VSS2 of the second power input terminal VIN2 may be provided to the Q node, and the Q node may be reset by the second low voltage VSS2. The fifth transistor T5 may form a reset circuit for resetting the Q node.

In an embodiment, the fifth transistor T5 may include a 5-1th transistor T5-1 (e.g., a third sub-transistor) and a 5-2th transistor T5-2 (e.g., a fourth sub-transistor) connected in series between the Q node and the second power input terminal VIN2. A first electrode of the 5-1th transistor T5-1 may be connected to the Q node, a second electrode may be connected to the first node N1, and a gate electrode may be connected to the fourth input terminal IN4. A first electrode of the 5-2th transistor T5-2 may be connected to the first node N1, a second electrode may be connected to the second power input terminal VIN2, and a gate electrode may be connected to the fourth input terminal IN4.

A first electrode of the sixth transistor T6 may be connected to the Q node, a second electrode may be connected to the second power input terminal VIN2, and a gate electrode may be connected to the third input terminal IN3. The sixth transistor T6 may connect the Q node and the second power input terminal VIN2 to each other in response to the n+3th carry signal CR(n+3) (e.g., the second next carry signal) of the third input terminal IN3. In this case, the second low voltage VSS2 of the second power input terminal VIN2 may be provided to the Q node, and the Q node may transition to or be maintained at the second low voltage VSS2. The sixth transistor T6 may form the first control circuit that controls the Q node.

In an embodiment, the sixth transistor T6 may include a 6-1th transistor T6-1 (e.g., a fifth sub-transistor) and a 6-2th transistor T6-2 (e.g., a sixth sub-transistor) connected in series between the Q node and the second power input terminal VIN2. A first electrode of the 6-1th transistor T6-1 may be connected to the Q node, a second electrode may be connected to the first node N1, and a gate electrode may be connected to the third input terminal IN3. A first electrode of the 6-2th transistor T6-2 may be connected to the first node N1, a second electrode may be connected to the second power input terminal VIN2, and a gate electrode may be connected to the third input terminal IN3.

A first electrode of the seventh transistor T7 may be connected to the third power input terminal VIN3, a second electrode may be connected to the QB node, and a gate electrode may be connected a second node N2. The seventh transistor T7 may connect the third power input terminal VIN3 and the QB node to each other in response to a voltage of the second node N2. In this case, the first high voltage VGH1 of the third power input terminal VIN3 may be provided to the QB node, and the QB node may transition to or be maintained at the first high voltage VGH1.

A first electrode of the eighth transistor T8 may be connected to the QB node, a second electrode may be connected to the second power input terminal VIN2, and a gate electrode may be connected to the Q node. The eighth transistor T8 may connect the QB node and the second power input terminal VIN2 to each other in response to the voltage of the Q node. In this case, the second low voltage VSS2 of the second power input terminal VIN2 may be provided to the QB node, and the QB node may transition to or be maintained at the second low voltage VSS2.

A first electrode of the ninth transistor T9 may be connected to the third power input terminal VIN3, a second electrode may be connected to the second node N2, and a gate electrode may be connected to the third power input terminal VIN3. The ninth transistor T9 may be connected in a diode form, and may transmit the first high voltage VGH1 of the third power input terminal VIN3 to the second node N2.

In an embodiment, the ninth transistor T9 may include a 9-1th transistor T9-1 (e.g., a seventh sub-transistor) and a 9-2th transistor T9-2 (e.g., an eighth sub-transistor) connected in series between the third power input terminal VIN3 and the second node N2. A first electrode of the 9-1th transistor T9-1 may be connected to the third power input terminal VIN3, a second electrode may be connected to a first electrode of the 9-2th transistor T9-2, and a gate electrode may be connected to the third power input terminal VIN3. The first electrode of the 9-2th transistor T9-2 may be connected to the second electrode of the 9-1th transistor T9-1, a second electrode may be connected to the second node N2, and a gate electrode may be connected to the third power input terminal VIN3. For convenience of illustration, a portion where the second electrode of the 9-1th transistor T9-1 and the first electrode of the 9-2th transistor T9-2 are connected to each other may be referred to as a third node N3.

A first electrode of the tenth transistor T10 may be connected to the second node N2, a second electrode may be connected to the first power input terminal VIN1, and a gate electrode may be connected to the Q node. The tenth transistor T10 may connect the second node N2 and the first power input terminal VIN1 to each other in response to the voltage of the Q node. In this case, the first low voltage VSS1 of the first power input terminal VIN1 may be provided to the second node N2, and the second node N2 may transition to or be maintained at the first low voltage VSS1.

The seventh transistor T7, the eighth transistor T8, the ninth transistor T9, and the tenth transistor T10 may form a second control circuit that controls the QB node.

A first electrode of the eleventh transistor T11 may be connected to the clock input terminal CIN, a second electrode may be connected to the second output terminal COUT, and a gate electrode may be connected to the Q node. The eleventh transistor T11 may output the nth clock signal CK(n) of the clock input terminal CIN as the nth carry signal CR(n) in response to the voltage of the Q node. The clock input terminal CIN may be connected to (e.g., only to) the eleventh transistor T11 and the first transistor T1, and the nth clock signal CK(n) may be used as (e.g., only as) the nth carry signal CR(n) and the nth scan signal GW(n). In this case, the clock line CKL (e.g., refer to FIG. 2) for transmitting the nth clock signal CK(n) may intersect or cross (e.g., may overlap) with other signal lines or components (and a parasitic capacitance generated thereby may be minimized or reduced), and the load on the clock line CKL may be minimized or reduced. In other words, a signal delay of the nth scan signal GW(n) and the nth carry signal CR(n) may be minimized or reduced.

A first electrode of the twelfth transistor T12 may be connected to the second output terminal COUT, a second electrode may be connected to the second power input terminal VIN2, and a gate electrode may be connected to the QB node. The twelfth transistor T12 may pull-down and maintain or substantially maintain a voltage level of the nth carry signal CR(n) to the second low voltage VSS2 of the second power input terminal VIN2 in response to the voltage of the QB node.

The eleventh transistor T11 and the twelfth transistor T12 may form a second buffer circuit that outputs the nth carry signal CR(n).

A first electrode of the thirteenth transistor T13 may be connected to the Q node, a second electrode may be connected to the second output terminal COUT, and a gate electrode may be connected to the QB node. The thirteenth transistor T13 may connect the Q node and the second output terminal COUT with each other in response to the voltage of the QB node. When the twelfth transistor T12 and the thirteenth transistor T13 are turned-on in response to the voltage of the QB node, the Q node may be maintained or substantially maintained at the second low voltage VSS2.

A first electrode of the fourteenth transistor T14 may be connected to the third power input terminal VIN3, a second electrode may be connected to the first node N1, and a gate electrode may be connected to the Q node. The fourteenth transistor T14 may connect the third power input terminal VIN3 and the first node N1 to each other in response to the voltage of the Q node. In this case, the first high voltage VGH1 of the third power input terminal VIN3 may be provided to the first node N1, and the fourth transistor T4, the fifth transistor T5, and the sixth transistor T6 may operate more stably.

In an embodiment, the fourteenth transistor T14 may include a fourteenth-1 transistor T14-1 (e.g., a ninth sub-transistor) and a fourteenth-2 transistor T14-2 (e.g., a tenth sub-transistor) connected in series between the third power input terminal VIN3 and the first node N1. A first electrode of the 14-1th transistor T14-1 may be connected to the third power input terminal VIN3, a second electrode may be connected to the first electrode of the 14-2th transistor T14-2, and a gate electrode may be connected to the Q node. A first electrode of the 14-2th transistor T14-2 may be connected to a second electrode of the 14-1th transistor T14-1, the second electrode may be connected to the first node N1, and a gate electrode may be connected to the Q node.

As described above, the clock line for transmitting the clock signal CK(n) may be connected to (e.g., only to) the eleventh transistor T11 and the first transistor T1, so that a parasitic capacitance and load on the clock line may be minimized or reduced, and a signal delay of the nth scan signal GW(n) may also be minimized or reduced.

FIG. 6 is a waveform diagram illustrating the operation of the stage of FIG. 5.

Referring to FIG. 5 and FIG. 6, the first clock signal CK1, the second clock signal CK2, the third clock signal CK3, and the fourth clock signal CK4 may periodically have the same or substantially the same waveform as each other with the second low voltage VSS2 (e.g., the gate-off voltage) and the second high voltage VGH2 (e.g., the fourth voltage, the gate-on voltage, or the like), but may have different phases from each other. The second clock signal CK2 may have a phase lag of 90 degrees (e.g., a ¼ period) behind the first clock signal CK1, the third clock signal CK3 may have a phase lag of 180 degrees (e.g., a ½ period) behind the first clock signal CK1, and the fourth clock signal CK4 may have a phase lag of 270 degrees (e.g., a ¾ period) behind the first clock signal CK1.

As an example, the third clock signal CK3 may be provided as the nth clock signal CK(n) in the nth stage STn.

At a first time point TP1, the n−2th carry signal CR(n−2) may transition from the second low voltage VSS2 to the second high voltage VGH2. In other words, the n−2th carry signal CR(n−2) of the gate-on voltage at the first time point TP1 may be provided to the nth stage STn. In this case, the n−2th carry signal CR(n−2) of the gate-on voltage may be provided to the Q node through the fourth transistor T4, and the voltage of the Q node may transition from the second low voltage VSS2 to the second high voltage VGH2. The first transistor T1 and the eleventh transistor T11 may be turned-on in response to the voltage of the Q node, and the third clock signal CK3 may be output as the nth carry signal CR(n) and the nth scan signal GW(n). However, because the third clock signal CK3 has the second low voltage VSS2, the nth carry signal CR(n) and the nth scan signal GW(n) may have the second low voltage VSS2 (or the first low voltage VSS1). The first capacitor C1 may be charged with a voltage corresponding to a difference between the second high voltage VGH2 and the second low voltage VSS2.

When the voltage of the Q node transitions from the second low voltage VSS2 to the second high voltage VGH2, the tenth transistor T10 and the eighth transistor T8 may be turned-on in response to the voltage of the Q node. Although the first high voltage VGH1 through the ninth transistor T9 and the first low voltage VSS1 through the tenth transistor T10 may be applied to the second node N2, the voltage of the second node N2 may be shifted to the first low voltage VSS1 by implementing the ninth transistor T9 as a dual gate transistor and the tenth transistor T10 as a single gate transistor. The first low voltage VSS1 may be applied to the second node N2 through the tenth transistor T10, so that the seventh transistor T7 is turned-off, and the voltage of the QB node may transition to the second low voltage VSS2 through the eighth transistor T8. The third transistor T3, the twelfth transistor T12, and the thirteenth transistor T13 may be turned-off in response to the voltage of the QB node.

At a second time point TP2, the n−2th carry signal CR(n−2) may transition from the second high voltage VGH2 to the second low voltage VSS2. In this case, the fourth transistor T4 may be turned-off.

In addition, at the second time point TP2, the third clock signal CK3 may transition from the second low voltage VSS2 to the second high voltage VGH2. In this case, because the third clock signal CK3 may be output as the nth carry signal CR(n) through the eleventh transistor T11 in the turn-on state, the nth carry signal CR(n) may transition from the second low voltage VSS2 to the second high voltage VGH2. In other words, the nth carry signal CR(n) of the gate-on voltage may be output. In addition, because the third clock signal CK3 is output as the nth scan signal GW(n) through the first transistor T1 in the turn-on state, the nth scan signal GW(n) may transition from the second low voltage VSS2 to the second high voltage VGH2. In other words, the nth scan signal GW(n) of the gate-on voltage may be output. The first capacitor C1 bootstraps the voltage of the Q node, so that the voltage of the Q node transitions to a voltage higher than that of the second high voltage VGH2, and the nth scan signal GW(n) may transition more quickly from the second low voltage VSS2 to the second high voltage VGH2.

At a third time TP3, the third clock signal CK3 may transition from the second high voltage VGH2 to the second low voltage VSS2. In this case, because the third clock signal CK3 is output as the nth carry signal CR(n) through the eleventh transistor T11 in the turned-on state, the nth carry signal CR(n) may transition from the second high voltage VGH2 to the second low voltage VSS2. The voltage of the Q node may be shifted to the second high voltage VGH2 by the first capacitor C1. In addition, because the third clock signal CK3 may be output as the nth scan signal GW(n) through the first transistor T1 in the turn-on state, the nth scan signal GW(n) may transition from the second high voltage VGH2 to the second low voltage VSS2. However, when the nth scan signal GW(n) is pulled down by (e.g., only by) the third clock signal CK3 due to the load of the scan line to which the nth scan signal GW(n) is applied, the nth scan signal GW(n) may slowly transition from the second high voltage VGH2 to the second low voltage VSS2. In other words, when the nth scan signal GW(n) is pulled down by (e.g., only by) the third clock signal CK3, a falling slew (e.g., a transition time) of the nth scan signal GW(n) may be prolonged.

At the third time point TP3, the n+2th carry signal CR(n+2) may transition from the second low voltage VSS2 to the second high voltage VGH2. In this case, the second transistor T2 may be turned-on in response to the n+2th carry signal CR(n+2), and the nth scan signal GW(n) may be pulled down to the second low voltage VSS2. Accordingly, despite the load of the scan line to which the nth scan signal GW(n) is applied, the nth scan signal GW(n) may more quickly transition from the second high voltage VGH2 to the second low voltage VSS2. In other words, the falling slew of the nth scan signal GW(n) may be shortened.

At a fourth time point TP4, the n+3th carry signal CR(n+3) may transition from the second low voltage VSS2 to the second high voltage VGH2. In this case, the sixth transistor T6 may be turned on in response to the n+3th carry signal CR(n+3), and the Q node may transition from the second high voltage VGH2 to the second low voltage VSS2. The first transistor T1 and the eleventh transistor T11 may be turned off in response to the voltage of the Q node. In other words, the output of the nth scan signal GW(n) and the nth carry signal CR(n) may be stopped.

In addition, the tenth transistor T10 and the eighth transistor T8 may be turned off in response to the voltage of the Q node, the first high voltage VGH1 may be applied to the second node N2 through the ninth transistor T9 to turn on the seventh transistor T7, and the first high voltage VGH1 may be applied to the QB node through the seventh transistor T7. In response to the voltage of the QB node, the third transistor T3 and the twelfth transistor T12 may be turned on, the nth scan signal GW(n) may be pulled down or may transition to the first low voltage VSS1, and the nth carry signal CR(n) may also be pulled down or maintained to the second low voltage VSS2. The thirteenth transistor T13 may be turned on in response to the voltage of the QB node, and the Q node may be maintained or substantially maintained at the second low voltage VSS2 through the thirteenth transistor T13 and the twelfth transistor and T12.

As described above, as the second transistor T2 pulls down the nth scan signal GW(n) to the second low voltage VSS2 in response to the n+2th carry signal CR(n+2), the falling slew of the nth scan signal GW(n) may be shortened. In other words, the signal delay of the nth scan signal GW(n) may be minimized or reduced.

Figure 7:
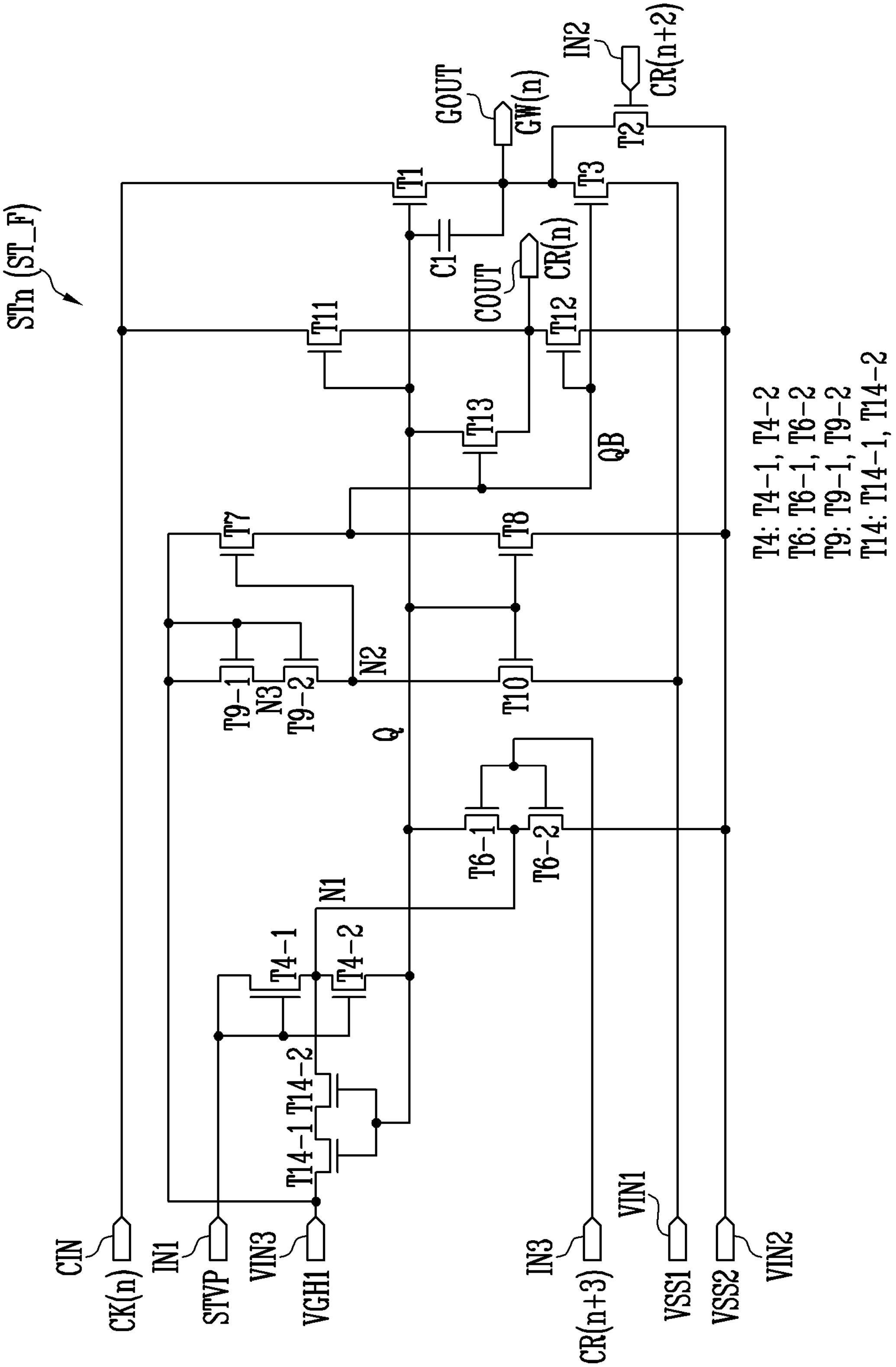
FIG. 7 is a diagram illustrating a stage included in the gate driver of FIGS. 3 and 4 according to an embodiment of the present disclosure.

FIG. 7 is a diagram illustrating the stage included in the gate driver 130 of FIGS. 3 and 4 according to an embodiment of the present disclosure.

Referring to FIGS. 3 to 7, the nth stage STn may be the front stage ST_F. In this case, n may be equal to 1 or 2.

Except for the fifth transistor T5 described above with reference to FIG. 5, the front stage ST_F illustrated in FIG. 7 may be the same or substantially the same as (or similar to) the main stage ST_M described above with reference to FIG. 5, and thus, redundant description thereof may not be repeated hereinafter.

The first input terminal IN1 may be provided with the start signal STVP instead of the n−2th carry signal CR(n−2) of FIG. 5. The fourth transistor T4 may transmit the start signal STVP to the Q node. As described above with reference to FIGS. 5 and 6, the main stage ST_M of FIG. 5 outputs the nth carry signal CR(n) and the nth scan signal GW(n) in response to the n−2th carry signal CR (n−2), and the front stage ST_F of FIG. 7 may output the nth carry signal CR(n) and the nth scan signal GW(n) in the nth stage STn in response to the start signal STVP.

The fifth transistor T5 in FIG. 5 may connect the Q node and the second power input terminal VIN2 to each other in response to the start signal STVP of the fourth input terminal IN4, and may provide the Q node with the second low voltage VSS2 of the second power input terminal VIN2. When the front stage ST_F includes the fifth transistor T5, the start signal STVP and the second low voltage VSS2 may be concurrently (e.g., simultaneously or substantially simultaneously) provided to the Q node, and the front stage ST_F may fail to operate normally. Therefore, the front stage ST_F may not include the fifth transistor T5.

Figure 8:
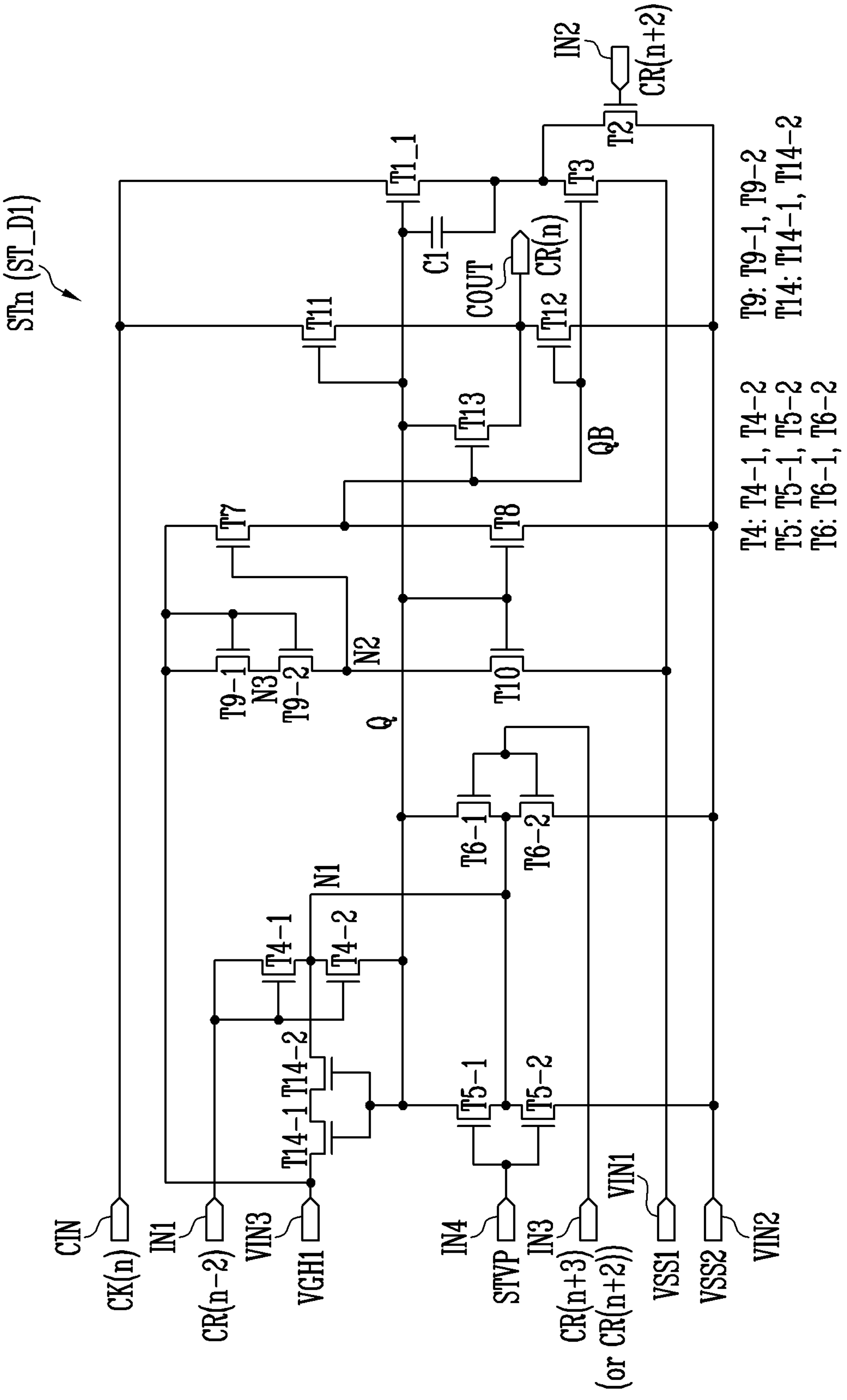
FIG. 8 is a diagram illustrating a stage included in the gate driver of FIGS. 3 and 4 according to an embodiment of the present disclosure.

FIG. 8 is a diagram illustrating the stage included in the gate driver 130 of FIGS. 3 and 4 according to an embodiment of the present disclosure.

Referring to FIGS. 3 to 8, the nth stage STn may be the first dummy stage ST_D1. In this case, n may be equal to i+1 or i+2.

Except for the signal applied to the third input terminal IN3 and a first transistor T1_1, the first dummy stage ST_D1 illustrated in FIG. 8 may be the same or substantially the same as (or similar to) the main stage ST_M described above with reference to FIG. 5, and thus, redundant description thereof may not be repeated hereinafter.

The third input terminal IN3 may be provided with the n+3th carry signal CR(n+3) or the n+2th carry signal CR(n+2). The sixth transistor T6 may connect the Q node and the second power input terminal VIN2 to each other in response to the n+3th carry signal CR(n+3) or the n+2th carry signal CR(n+2). In this case, the Q node may transition to or be maintained at the second low voltage VSS2. The sixth transistor T6 may form the first control circuit that controls the Q node.

The first dummy stage ST_D1 may not output the scan signal GW(n) (e.g., refer to FIG. 5). Accordingly, in order to transition the scan signal GW(n) to the second low voltage VSS2 at the third time point TP3 in FIG. 6, the nth clock signal CK(n) may not be used, and the first transistor T1_1 may be turned-off at the third time point TP3, so that the sixth transistor T6 may be turned-on in response to the n+2th carry signal CR(n+2).

In an embodiment, the size of a channel of the first transistor T1_1 may be smaller than the size of a channel of the first transistor T1 of the main stage ST_M described above with reference to FIG. 5. Because the first dummy stage ST_D1 may not output the scan signal, the channel of the first transistor T1_1 may be smaller than the channel of the first transistor T1 of the main stage ST_M described above with reference to FIG. 5. According to an embodiment, the channel of the first transistor T1_1 may be smaller than a channel of the eleventh transistor T11.

Figure 9:
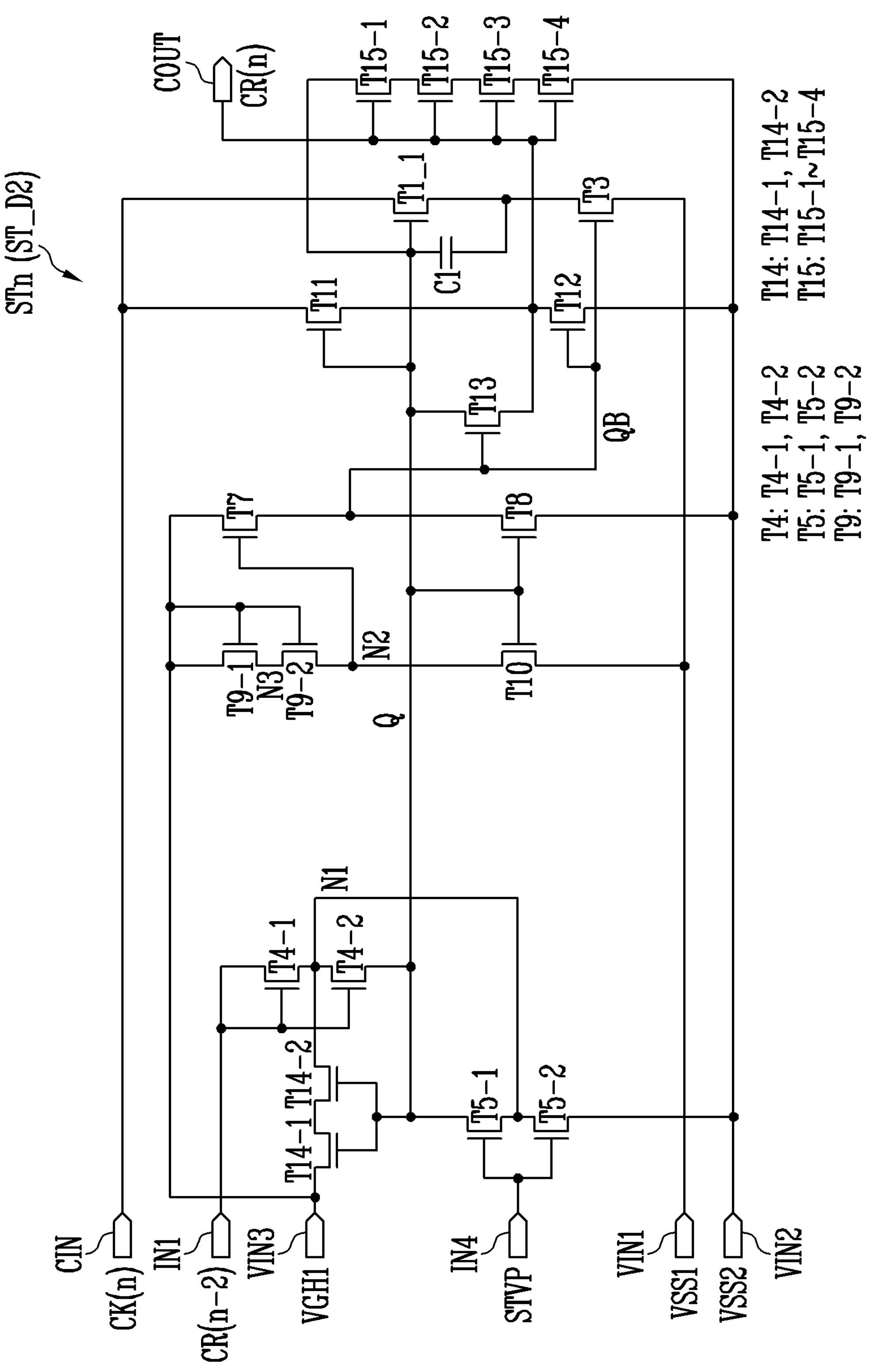
FIG. 9 is a diagram illustrating a stage included in the gate driver of FIGS. 3 and 4 according to an embodiment of the present disclosure.

FIG. 9 is a diagram illustrating the stage included in the gate driver 130 of FIGS. 3 and 4 according to an embodiment of the present disclosure.

Referring to FIGS. 3 to 9, the nth stage STn may be the second dummy stage ST_D2. In this case, n may be equal to i+3 or i+4.

Except for the second transistor T2 and the sixth transistor T6 illustrated in FIG. 8 and the fifteenth transistor T15 illustrated in FIG. 9, the second dummy stage ST_D2 illustrated in FIG. 9 may be the same or substantially the same as (or similar to) the first dummy stage ST_D1 described above with reference to FIG. 8, and thus, redundant description thereof may not be repeated hereinafter.

The second transistor T2 and the sixth transistor T6 described above with reference to FIG. 8 may operate in response to the next carry signal of the next stage, but there may be no next stage to provide the next carry signal after the second dummy stage ST_D2, and the second dummy stage ST_D2 may actually be the last stage. Accordingly, the second dummy stage ST_D2 may not include the second transistor T2 and the sixth transistor T6.

The second dummy stage ST_D2 may further include the fifteenth transistor T15.

A first electrode of the fifteenth transistor T15 may be connected to the Q node, a second electrode may be connected to the second power input terminal VIN2, and a gate electrode may be connected to the second output terminal COUT. The fifteenth transistor T15 may connect the Q node and the second power input terminal VIN2 to each other in response to the nth carry signal CR(n) of the second output terminal COUT. In this case, the second low voltage VSS2 of the second power input terminal VIN2 may be provided to the Q node, and the Q node may transition to or be maintained at the second low voltage VSS2. When the nth carry signal CR(n) is output, the Q node may be gradually reset by the fifteenth transistor T15. Unlike the sixth transistor T6 described above with reference to FIG. 8 for controlling the Q node in response to the next carry signal, the fifteenth transistor T15 may control the Q node in response to the nth carry signal CR(n), or in other words, a current carry signal.

In an embodiment, the fifteenth transistor T15 may include a plurality of transistors (e.g., sub-transistors) connected in series between the Q node and the second power input terminal VIN2. For example, the fifteenth transistor T15 may include four transistors connected in series between the Q node and the second power input terminal VIN2, for example, such as a 15-1th transistor T15-1, a 15-2th transistor T15-2, a 15-3th transistor T15-3, and a 15-4th transistor T15-4. However, the present disclosure is not limited thereto, and for example, the fifteenth transistor T15 may include two, three, or five or more transistors. When the fifteenth transistor T15 includes the plurality of transistors that are connected in series, a turn-on resistance (e.g., turn-on resistances connected in series) of the fifteenth transistor T15 increases, a discharge speed of the Q node decreases, and the nth carry signal GW(n) having a normal waveform may be output.

Figure 10:
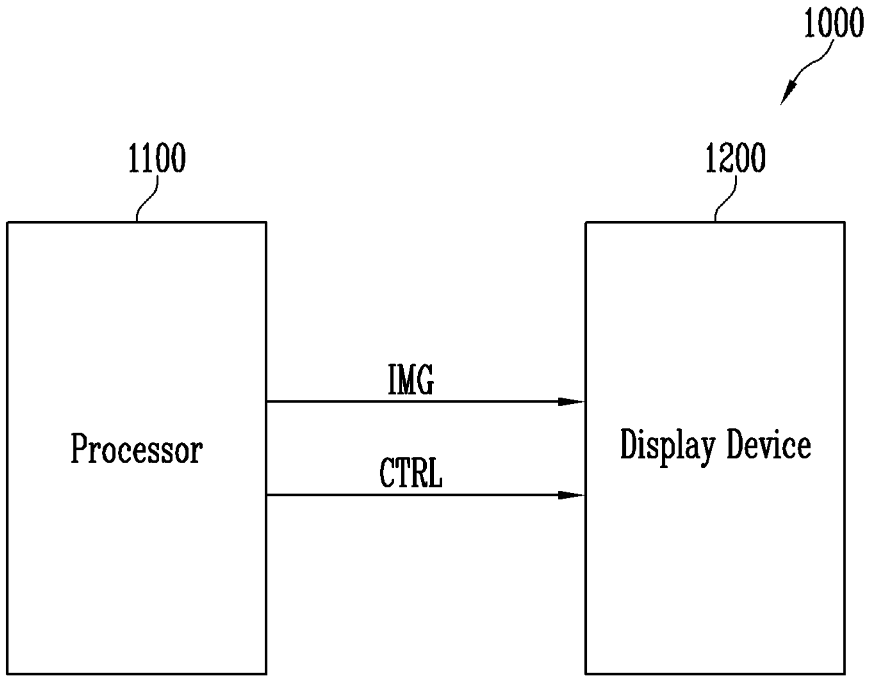
FIG. 10 is a block diagram illustrating a display system according to an embodiment of the present disclosure.

FIG. 10 is a block diagram illustrating a display system 1000 according to an embodiment of the present disclosure.

Referring to FIG. 10, the display system 1000 may include a processor 1100 and a display device 1200.

The processor 1100 may perform various suitable tasks and calculations. In some embodiments, the processor 1100 may include an application processor, a graphics processor, a microprocessor, a Central Processing Unit (CPU), or the like. The processor 1100 may be connected to the other components of the display system 1000 through a bus system to control them.

The processor 1100 may transmit image data IMG and a control signal CTRL to the display device 1200. The display device 1200 may display an image based on the image data IMG and the control signal CTRL. The display device 1200 may be configured similarly to that of the display device 100 described above with reference to FIG. 1. In this case, the image data IMG and the control signal CTRL may be provided as the input data Din and the control signal CS, respectively, described above with reference to FIG. 1.

The display system 1000 may include a computing system that provides image display functionality, such as a smart watch, a mobile phone, a smart phone, a portable computer, a tablet Personal Computer (PC), a watch phone, an automatic display, smart glasses, a Portable Multimedia Player (PMP), a navigation, an Ultra-Mobile Personal Computer (UMPC), and the like. In addition, the display system 1000 may include at least one of a Head-Mounted Display (HMD) device, a Virtual Reality (VR) device, a Mixed Reality (MR) device, and/or an Augmented Reality (AR) device.

FIGS. 11 through 14 are perspective views illustrating some examples to which the display system of FIG. 10 are applied.

Figure 11:
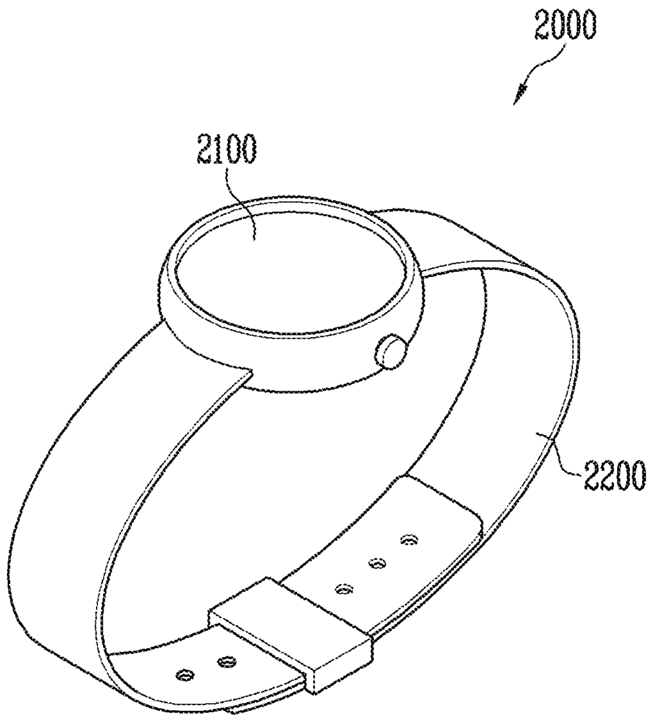
FIGS. 11-14 are perspective views illustrating some examples to which the display system of FIG. 10 are applied.

Referring to FIG. 11, the display system 1000 of FIG. 10 may be applied to a smart watch 2000 including a display unit 2100 and a strap unit 2200.

The smart watch 2000 may be a wearable electronic device. For example, the smart watch 2000 may have a structure in which the strap unit 2200 is mounted on a user's wrist. Here, the display system 1000 and/or the display device 1200 may be applied to the display unit 2100, so that image data including time information may be provided to the user.

Figure 12:
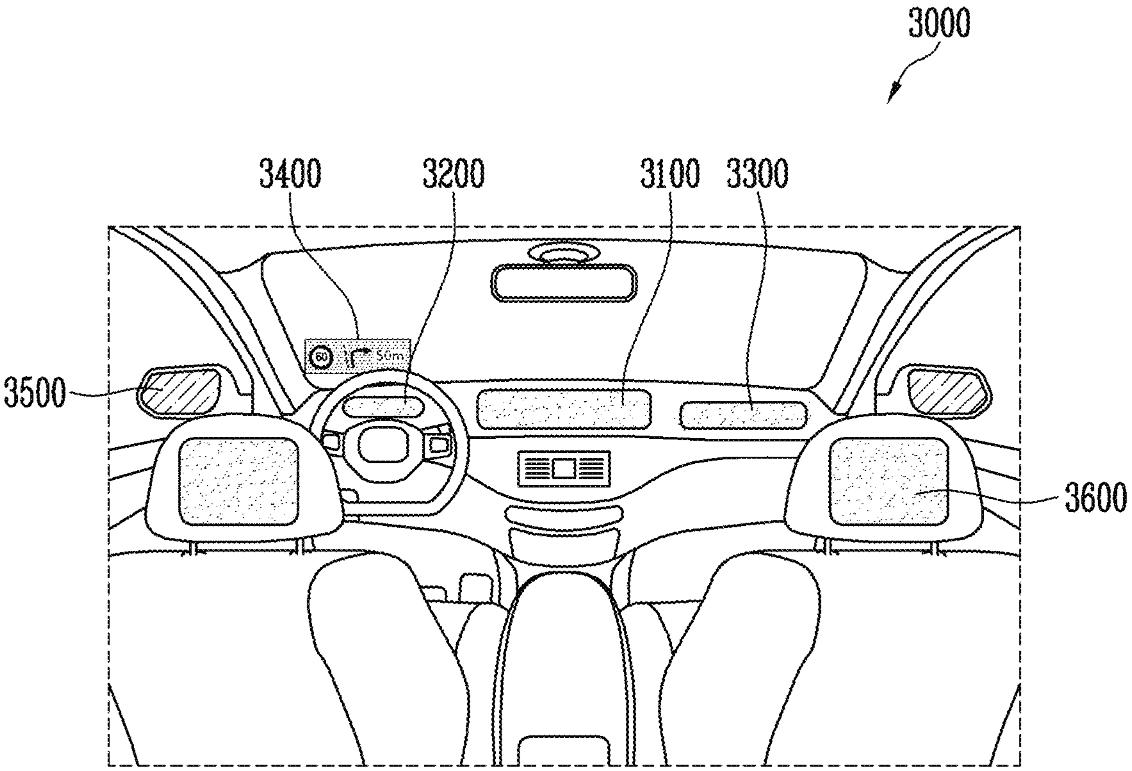

Referring to FIG. 12, the display system 1000 of FIG. 10 may be applied to an automatic display system 3000. Here, the automatic display system 3000 may include a computing system provided inside and/or outside a vehicle to provide image data.

For example, the display system 1000 and/or the display device 1200 may be applied to at least one of an infotainment panel 3100, a cluster 3200, a co-driver display 3300, a head-up display 3400, a side mirror display 3500, and/or a rear seat display 3600 provided in the vehicle.

Figure 13:
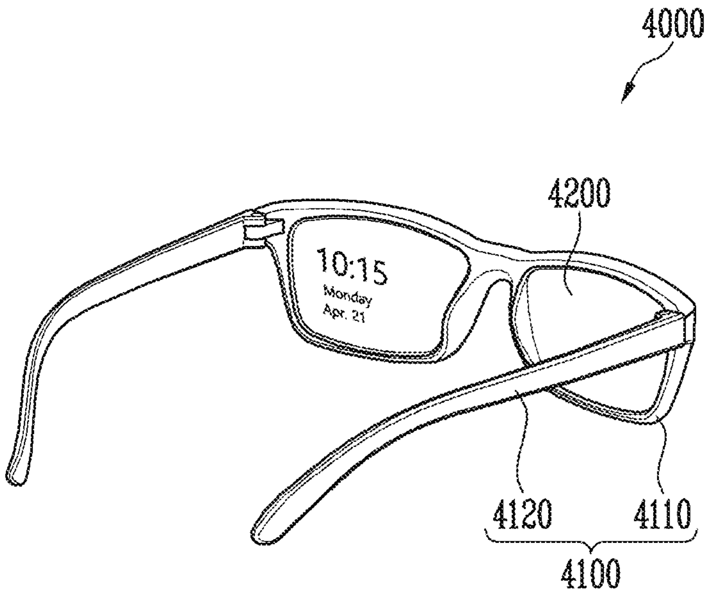

Referring to FIG. 13, the display system 1000 of FIG. 10 may be applied to smart glasses 4000. The smart glasses 4000 may be a wearable electronic device that is wearable on a user's head. For example, the smart glasses 4000 may be a wearable device for augmented reality.

The smart glasses 4000 may include a frame 4100 and a lens unit 4200. The frame 4100 may include a housing 4110 that supports the lens unit 4200, and a leg unit 4120 for wearing by the user. The leg unit 4120 is connected to the housing 4110 through a hinge, and may be folded or unfolded with respect to the housing 4110.

The frame 4100 may include a battery, a touch pad, a microphone, a camera, and the like. In addition, a projector that outputs light, a processor that controls an optical signal, and the like may be embedded in the frame 4100.

The lens unit 4200 may include an optical member that transmits or reflects light. For example, the lens unit 4200 may include glass, a transparent synthetic resin, or the like.

In order for the user's eyes to recognize visual information, the lens unit 4200 may reflect an image by an optical signal transmitted from the projector of the frame 4100 by a rear surface (e.g., a surface facing the user's eye) of the lens unit 42000. For example, the user may recognize visual information, such as a time and a date, displayed on the lens unit 4200. In this case, the projector and/or the lens unit 4200 may be a kind of display device. The display device 1200 may be applied to the projector and/or the lens unit 4200.

Figure 14:
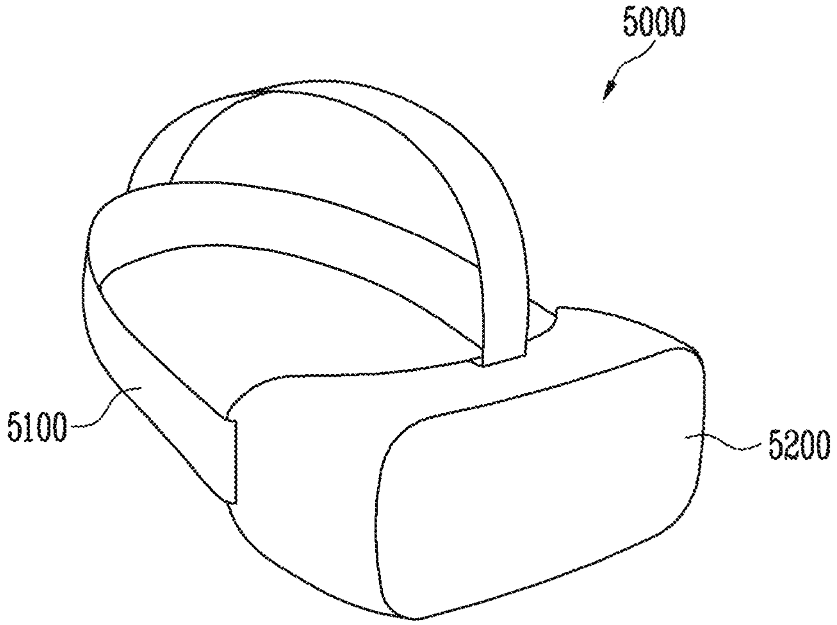

Referring to FIG. 14, the display system 1000 of FIG. 10 may be applied to a head-mounted display device 5000.

The head-mounted display device 5000 may be a wearable electronic device that can be worn on a user's head. For example, the head-mounted display device 5000 may be a wearable device for virtual reality or mixed reality.

The head-mounted display device 5000 may include a head-mounted band 5100 and a display device housing case 5200. The head mounted band 5100 may be connected to the display device housing case 5200. The head mounted band 5100 may include a horizontal band and/or a vertical band for fixing the head mounted display device 5000 to the user's head. The horizontal band may surround (e.g., around a periphery of) a side of the user's head, and the vertical band may surround (e.g., around a periphery of) an upper portion of the user's head. However, the present disclosure is not limited thereto. For example, the head mounted band 5100 may be implemented in the form of an eyeglass frame, a helmet, or the like.

The display device housing case 5200 may store the display system 1000 and/or the display device 1200.

Although some embodiments and examples have been described herein, it is intended to provide a more general understanding of the present disclosure. Thus, the present disclosure is not limited to the above embodiments, and various modifications and variations may be made by those having ordinary skill in the art in view of the present disclosure.

According to some embodiments of the present disclosure, in a gate driver, a display device, and an electronic device, a clock line for transmitting a clock signal may be connected to (e.g., only to) an eleventh transistor and a first transistor, so that a parasitic capacitance and a load on the clock line may be minimized or reduced, and a signal delay of a scan signal may be minimized or reduced.

In addition, according to some embodiments of the present disclosure, a second transistor may pull down the scan signal to a second low voltage in response to a next carry signal, so that a falling slew of the scan signal may be shortened.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A gate driver comprising:

a plurality of stages, at least one of the plurality of stages comprising:

a first transistor comprising a first electrode connected to a clock signal line, a second electrode connected to a first output terminal configured to output a scan signal, and a gate electrode connected to a Q node;

a first capacitor connected between the gate electrode and the second electrode of the first transistor;

a second transistor connected between the first output terminal and a second power supply, and comprising a gate electrode configured to receive a first next carry signal;

a third transistor connected between the first output terminal and a first power supply, and comprising a gate electrode connected to a QB node;

an eleventh transistor connected between the clock signal line and a second output terminal configured to output a carry signal, and comprising a gate electrode connected to the Q node;

a twelfth transistor connected between the second output terminal and the second power supply, and comprising a gate electrode connected to the QB node;

a fourth transistor diode-connected between a first input terminal configured to be applied with a previous carry signal and the Q node;

a fifth transistor connected between the Q node and the second power supply, and comprising a gate electrode connected to a start signal line; and a sixth transistor connected between the Q node and the second power supply, and comprising a gate electrode configured to receive a second next carry signal.

2. The gate driver according to claim 1, wherein a voltage level of the second power supply is lower than a voltage level of the first power supply.

3. The gate driver according to claim 1, wherein the clock signal line is connected only to the first transistor and the eleventh transistor of the at least one of the plurality of stages.

4. The gate driver according to claim 1, wherein the at least one of the plurality of stages further comprises:

a seventh transistor connected between a third power supply and the QB node, and comprising a gate electrode connected to a second node;

an eighth transistor connected between the QB node and the second power supply, and comprising a gate electrode connected to the Q node;

a ninth transistor diode-connected between the third power supply and the second node; and a tenth transistor connected between the second node and the first power supply, and comprising a gate electrode connected to the Q node.

5. The gate driver according to claim 4, wherein the ninth transistor comprises sub-transistors connected in series between the third power supply and the second node.

6. The gate driver according to claim 4, wherein the at least one of the plurality of stages further comprises a thirteenth transistor connected between the Q node and the second output terminal, and comprising a gate electrode connected to the QB node.

7. The gate driver according to claim 4, wherein the at least one of the plurality of stages further comprises a fourteenth transistor connected between the third power supply and a first node, and comprising a gate electrode connected to the Q node, and wherein the fourth transistor comprises a first sub-transistor connected between the first input terminal and the first node, and a second sub-transistor connected between the first node and the Q node.

8. The gate driver according to claim 7, wherein the fourteenth transistor comprises sub-transistors connected in series between the third power supply and the first node.

9. The gate driver according to claim 7, wherein the fifth transistor comprises a third sub-transistor connected between the Q node and the first node, and a fourth sub-transistor connected between the first node and the second power supply, and wherein the sixth transistor comprises a fifth sub-transistor connected between the Q node and the first node, and a sixth sub-transistor connected between the first node and the second power supply.

10. The gate driver according to claim 1, wherein a front stage located before the at least one of the plurality of stages comprises the first transistor, the second transistor, the third transistor, the fourth transistor, the sixth transistor, and the first capacitor, but does not include the fifth transistor, and wherein the first input terminal of the front stage is connected to the start signal line instead of the previous carry signal.

11. The gate driver according to claim 1, wherein the plurality of stages further comprises a first dummy stage located after the at least one stage, wherein the first dummy stage comprises the first transistor, the second transistor, the third transistor, the fourth transistor, the fifth transistor, the sixth transistor, and the first capacitor, and wherein a first output terminal of the first dummy stage is not configured to output the scan signal.

12. The gate driver according to claim 11, wherein a channel size of the first transistor of the first dummy stage is less than a channel size of the first transistor of the at least one stage.

13. The gate driver according to claim 11, wherein the plurality of stages further comprises a second dummy stage located after the first dummy stage, wherein the second dummy stage comprises the first transistor, the third transistor, the fourth transistor, the fifth transistor, and the first capacitor, but does not include the second transistor and the sixth transistor, and wherein the second dummy stage further comprises a fifteenth transistor connected between the Q node and the second power supply, and comprising a gate electrode connected to the second output terminal.

14. The gate driver according to claim 13, wherein the fifteenth transistor comprises sub-transistors connected in series between the Q node and the second power supply.

15. A display device, comprising:

a display panel comprising pixels connected to scan lines and data lines;

a data driver configured to supply a data signal to the data lines; and a gate driver comprising stages configured to respectively output scan signals to the scan lines, wherein at least one of the stages comprises:

a first transistor comprising a first electrode connected to a clock signal line, a second electrode connected to a first output terminal configured to output a scan signal from among the scan signals, and a gate electrode connected to a Q node;

a first capacitor connected between the gate electrode and the second electrode of the first transistor;

a second transistor connected between the first output terminal and a second power supply, and comprising a gate electrode configured to receive a first next carry signal;

a third transistor connected between the first output terminal and a first power supply, and comprising a gate electrode connected to a QB node;

an eleventh transistor connected between the clock signal line and a second output terminal configured to output a carry signal, and comprising a gate electrode connected to the Q node;

a twelfth transistor connected between the second output terminal and the second power supply, and comprising a gate electrode connected to the QB node;

a fourth transistor diode-connected between a first input terminal configured to be applied with a previous carry signal and the Q node;

a fifth transistor connected between the Q node and the second power supply, and comprising a gate electrode connected to a start signal line; and a sixth transistor connected between the Q node and the second power supply, and comprising a gate electrode configured to receive a second next carry signal.

16. The display device according to claim 15, wherein the clock signal line is connected only to the first transistor and the eleventh transistor of the at least one of the stages.

17. The display device according to claim 15, wherein the at least one of the stages further comprises:

a seventh transistor connected between a third power supply and the QB node, and comprising a gate electrode connected to a second node;

an eighth transistor connected between the QB node and the second power supply, and comprising a gate electrode connected to the Q node;

a ninth transistor diode-connected between the third power supply and the second node;

a tenth transistor connected between the second node and the first power supply, and comprising a gate electrode connected to the Q node; and a thirteenth transistor connected between the Q node and the second output terminal, and comprising a gate electrode connected to the QB node.

18. The display device according to claim 17, wherein the at least one of the stages further comprises a fourteenth transistor connected between the third power supply and a first node, and comprising a gate electrode connected to the Q node, and wherein the fourth transistor comprises a first sub-transistor connected between the first input terminal and the first node, and a second sub-transistor connected between the first node and the Q node.

19. The display device according to claim 15, wherein the fourth transistor is configured to transfer the previous carry signal of a gate-on voltage to the Q node, wherein the first transistor is configured to be turned-on in response to a voltage of the Q node, wherein a clock signal of the clock signal line is configured to be output as the scan signal from among the scan signals, wherein the second transistor is configured to pull down a voltage level of the scan signal to a voltage level of the second power supply in response to the first next carry signal of the gate-on voltage, and wherein the sixth transistor is configured to pull down the voltage of the Q node to the voltage level of the second power supply in response to the second next carry signal of the gate-on voltage.

20. An electronic device, comprising:

a processor configured to provide image data; and a display device configured to display an image based on the image data;

wherein the display device comprises:

a display panel comprising pixels connected to scan lines and data lines;

a data driver configured to supply a data signal to the data lines; and a gate driver comprising stages configured to respectively output scan signals to the scan lines, and wherein at least one of the stages comprises:

a first transistor comprising a first electrode connected to a clock signal line, a second electrode connected to a first output terminal configured to output a scan signal from among the scan signals, and a gate electrode connected to a Q node;

a first capacitor connected between the gate electrode and the second electrode of the first transistor;

a second transistor connected between the first output terminal and a second power supply, and comprising a gate electrode configured to receive a first next carry signal;

a third transistor connected between the first output terminal and a first power supply, and comprising a gate electrode connected to a QB node;

an eleventh transistor connected between the clock signal line and a second output terminal configured to output a carry signal, and comprising a gate electrode connected to the Q node;

a twelfth transistor connected between the second output terminal and the second power supply, and comprising a gate electrode connected to the QB node;

a fourth transistor diode-connected between a first input terminal configured to be applied with a previous carry signal and the Q node;

a fifth transistor connected between the Q node and the second power supply, and comprising a gate electrode connected to a start signal line; and a sixth transistor connected between the Q node and the second power supply, and comprising a gate electrode configured to receive a second next carry signal.

* * * * *